(12) United States Patent
Usui

(10) Patent No.: US 12,222,480 B2
(45) Date of Patent: Feb. 11, 2025

(54) PROJECTION ZOOM LENS AND PROJECTION DEVICE

(71) Applicant: Akitoshi Usui, Kanagawa (JP)

(72) Inventor: Akitoshi Usui, Kanagawa (JP)

(73) Assignee: RICOH INDUSTRIAL SOLUTIONS INC., Kanagawa (JP)

( * ) Notice: Subject to any disclaimer, the term of this patent is extended or adjusted under 35 U.S.C. 154(b) by 497 days.

(21) Appl. No.: 17/456,918

(22) Filed: Nov. 30, 2021

(65) Prior Publication Data

US 2022/0107484 A1 Apr. 7, 2022

(30) Foreign Application Priority Data

Oct. 1, 2020 (JP) .................................. 2020-167232

(51) Int. Cl.
| | | |
|---|---|---|
| *G02B 15/14* | (2006.01) | |
| *G02B 13/04* | (2006.01) | |
| *G02B 13/16* | (2006.01) | |
| *G02B 15/177* | (2006.01) | |
| *G02B 15/20* | (2006.01) | |

(52) U.S. Cl.
CPC ............ *G02B 15/177* (2013.01); *G02B 13/04* (2013.01); *G02B 13/16* (2013.01); *G02B 15/20* (2013.01)

(58) Field of Classification Search
CPC ... G02B 9/00; G02B 9/60; G02B 1/00; G02B 1/0015; G02B 1/002; G02B 1/0045; G02B 1/04; G02B 1/16; G02B 1/18; G02B 15/00; G02B 15/14; G02B 15/145; G02B 15/1455; G02B 15/145551; G02B 15/177; G02B 15/20

USPC .......................................... 359/676–692, 649
See application file for complete search history.

(56) References Cited

U.S. PATENT DOCUMENTS

| | | | | |
|---|---|---|---|---|
| 6,809,877 B2 * | 10/2004 | Nagahara | ....... | G02B 15/145531 |
| | | | | 359/683 |
| 7,773,309 B2 * | 8/2010 | Amano | ......... | G02B 15/145531 |
| | | | | 359/683 |
| 7,817,345 B2 * | 10/2010 | Inoko | ..................... | G02B 13/22 |
| | | | | 359/676 |

(Continued)

FOREIGN PATENT DOCUMENTS

| | | |
|---|---|---|
| JP | 5253604 | 7/2013 |
| JP | 2014-235217 | 12/2014 |

(Continued)

*Primary Examiner* — Thong Q Nguyen
(74) *Attorney, Agent, or Firm* — IPUSA, PLLC

(57) ABSTRACT

A projection zoom lens is configured by a first group having a negative refractive force, a second group having a positive refractive force, a third group having a positive refractive force, an aperture diaphragm, a fourth group having a positive refractive force, and a fifth group having a positive refractive force. The groups are arranged in aforementioned order from an enlarged-side to a reduced-side in the projection zoom lens, wherein the reduced-side is telecentric, wherein the first group is configured by a first sub-lens group having a positive or a negative refractive force, a second sub-lens group having a negative refractive force, and a third sub-lens group having a negative refractive force, wherein the sub-lens groups are arranged sequentially from the enlarged-side to form a focusing group, wherein the second group to the fifth group constitute a zooming group.

12 Claims, 57 Drawing Sheets

(56) References Cited

U.S. PATENT DOCUMENTS

2014/0355127 A1 12/2014 Nagahara
2017/0168274 A1 6/2017 Inoue

FOREIGN PATENT DOCUMENTS

| JP | 2014-240909 | 12/2014 |
| JP | 2017-107112 | 6/2017 |

* cited by examiner

WIDE-ANGLE END

TELEPHOTO END

WIDE-ANGLE END

TELEPHOTO END

WIDE-ANGLE END

TELEPHOTO END

WIDE-ANGLE END

TELEPHOTO END

FIG.8

| SURFACE NUMBER | R | d | Nd | νd |
|---|---|---|---|---|
| 0 | ∞ | d0 | | |
| 1 | ∞ | d1 | | |
| 2* | -3.0202 | 0.4866 | 1.50940 | 56.5 |
| 3* | -5.1745 | 1.1302 | | |
| 4 | ∞ | d4 | | |
| 5 | 18.8872 | 0.1935 | 1.79360 | 37.1 |
| 6 | 2.1154 | 1.5194 | | |
| 7 | ∞ | d7 | | |
| 8 | -28.9420 | 0.3023 | 1.49700 | 81.6 |
| 9 | 4.3889 | 0.8222 | | |
| 10 | -2.6576 | 0.3023 | 1.49700 | 81.6 |
| 11 | 28.2046 | 0.1246 | | |
| 12 | 116.0703 | 0.4740 | 2.00069 | 25.5 |
| 13 | -5.2526 | 0.0000 | | |
| 14 | ∞ | d14 | | |
| 15 | ∞ | d15 | | |
| 16 | 5.6201 | 0.8071 | 1.71736 | 29.5 |
| 17 | -5.6201 | 0.0605 | | |
| 18 | -5.4765 | 0.1511 | 1.94595 | 18.0 |
| 19 | -19.7743 | 0.0000 | | |
| 20 | ∞ | d20 | | |
| 21 | 5.7970 | 0.4232 | 1.69680 | 55.5 |
| 22 | -27.2010 | 0.0000 | | |
| 23 | ∞ | d23 | | |
| 24 (DIAPHRAGM) | ∞ | 0.3514 | | |
| 25 | -3.7236 | 0.4232 | 1.51680 | 64.2 |
| 26 | -2.2670 | 0.0091 | | |
| 27 | -2.1656 | 0.0846 | 2.00100 | 29.1 |
| 28 | 4.7939 | 0.0240 | | |
| 29 | 3.0051 | 0.5042 | 1.59349 | 67.0 |
| 30 | -3.0051 | 0.0193 | | |
| 31 | 4.3017 | 0.0967 | 2.00100 | 29.1 |
| 32 | 2.0823 | 0.0177 | | |
| 33 | 2.2099 | 1.0579 | 1.51860 | 69.9 |
| 34 | -1.6324 | 0.0421 | | |
| 35 | -1.5487 | 0.1149 | 1.87071 | 40.7 |
| 36 | -4.4494 | 0.1844 | | |
| 37 | -11.6711 | 0.7859 | 1.61340 | 44.3 |
| 38 | -2.6721 | 0.0000 | | |
| 39 | ∞ | d39 | | |
| 40 | 8.0844 | 0.3591 | 1.86966 | 20.0 |
| 41 | -14.7298 | 0.0181 | | |
| 42 | ∞ | 2.8715 | 1.51680 | 64.2 |
| 43 | ∞ | 1.1142 | | |
| 44 | ∞ | 0.0000 | | |
| 45 | ∞ | 0.0000 | | |
| IMG | ∞ | 0.0000 | | |

FIG.9

| SURFACE NUMBER | 2 | 3 |
|---|---|---|
| R | -3.0202 | -5.1745 |
| K | -10.1947 | -14.0544 |
| A3 | 2.320884E-02 | 2.335589E-02 |
| A4 | 2.192004E-02 | 4.895477E-02 |
| A5 | -1.061066E-02 | -2.781607E-02 |
| A6 | 9.847135E-04 | 5.018865E-03 |
| A7 | 3.011647E-04 | 2.246392E-04 |
| A8 | -1.522651E-05 | -1.949559E-04 |
| A9 | -1.620975E-05 | -7.907325E-06 |
| A10 | 4.308496E-07 | 1.682423E-05 |
| A11 | 2.292958E-07 | -2.304539E-06 |
| A12 | 5.735517E-08 | -2.142856E-06 |
| A13 | 4.839814E-08 | 8.433515E-07 |
| A14 | -3.728553E-08 | 1.712116E-08 |
| A15 | 1.090162E-08 | -1.902749E-08 |
| A16 | -1.458256E-09 | 2.506050E-09 |
| A17 | 3.503095E-11 | -6.538736E-09 |
| A18 | 1.874470E-12 | 1.759806E-09 |
| A19 | 2.787365E-13 | 1.678624E-11 |
| A20 | 1.122605E-13 | -2.739278E-11 |

FIG.10

|   | Wide | Middle | Tele |
|---|---|---|---|
| f | 1.000 | 1.118 | 1.252 |
| ω | 46.27 | 43.02 | 39.77 |
| Ymax | 1.043 | 1.043 | 1.043 |
| Fno | 1.80 | 1.87 | 1.96 |
| TL | 19.903 | 19.903 | 19.903 |
| BF(in air) | 3.025 | 3.025 | 3.025 |

FIG.11

| GROUP | FIRST SURFACE | f |
|---|---|---|
| G1 | 1 | -1.737 |
| G2 | 16 | 7.589 |
| G3 | 21 | 6.894 |
| G4 | 24 | 18.618 |
| G5 | 40 | 6.046 |
| G1a | 1 | -15.417 |
| G1b | 5 | -3.017 |
| G1c | 8 | -10.016 |

FIG.12A

|     | Wide   | Middle | Tele   |
|-----|--------|--------|--------|
| d0  | 148    | 148    | 148    |
| d15 | 1.6027 | 1.1033 | 0.6838 |
| d20 | 1.7750 | 1.5246 | 1.1282 |
| d23 | 1.6205 | 1.8620 | 2.1071 |
| d39 | 0.0302 | 0.5385 | 1.1093 |

FIG.12B

|     | SHORT RANGE | MEDIUM RANGE | LONG RANGE |
|-----|-------------|--------------|------------|
| d0  | 59          | 148          | 595        |
| d1  | -0.0317     | 0.0000       | 0.0183     |
| d4  | 0.0317      | 0.0000       | -0.0183    |
| d7  | -0.0709     | 0.0000       | 0.0339     |
| d14 | 0.0709      | 0.0000       | -0.0339    |

FIG.13A

|  | 1G-2G | 2G-3G | 3G-4G | 4G-5G |
|---|---|---|---|---|
| WIDE | 1.6027 | 1.7750 | 1.6205 | 0.0302 |
| TELE | 0.6838 | 1.1282 | 2.1071 | 1.1093 |

FIG.13B

|  | PROJECTION DISTANCE | 1a - 1b | 1b - 1c | 1c - 2G |
|---|---|---|---|---|
| SHORT RANGE | 59 | 0.0317 | -0.0709 | 0.0709 |
| LONG RANGE | 595 | -0.0183 | 0.0339 | -0.0339 |

FIG.14

| VALUE OF CONDITIONAL FORMULA (1) | -15.417 |
|---|---|
| VALUE OF CONDITIONAL FORMULA (2) | -10.016 |
| VALUE OF CONDITIONAL FORMULA (3) | 0.165 |
| VALUE OF CONDITIONAL FORMULA (4) | 20.02 |
| VALUE OF CONDITIONAL FORMULA (5) | 11.52 |
| VALUE OF CONDITIONAL FORMULA (6) | 17.98 |
| VALUE OF CONDITIONAL FORMULA (7) | -0.263 |
| VALUE OF CONDITIONAL FORMULA (8) | -1.737 |
| VALUE OF CONDITIONAL FORMULA (9) | 7.589 |
| VALUE OF CONDITIONAL FORMULA (10) | 81.61 |

FIG.16

| SURFACE NUMBER | R | d | Nd | νd |
|---|---|---|---|---|
| 0 | ∞ | d0 | | |
| 1 | ∞ | d1 | | |
| 2* | -3.0201 | 0.4866 | 1.50940 | 56.5 |
| 3* | -5.1743 | 1.1259 | | |
| 4 | ∞ | d4 | | |
| 5 | 18.9894 | 0.1934 | 1.79360 | 37.1 |
| 6 | 2.1218 | 1.5089 | | |
| 7 | ∞ | d7 | | |
| 8 | -23.8756 | 0.3023 | 1.49700 | 81.6 |
| 9 | 4.4130 | 0.8221 | | |
| 10 | -2.6996 | 0.3023 | 1.49700 | 81.6 |
| 11 | 27.1910 | 0.1015 | | |
| 12 | 116.0654 | 0.4739 | 2.00069 | 25.5 |
| 13 | -5.2524 | 0.0000 | | |
| 14 | ∞ | d14 | | |
| 15 | ∞ | d15 | | |
| 16 | 5.6199 | 0.8070 | 1.73037 | 32.2 |
| 17 | -5.6199 | 0.0605 | | |
| 18 | -5.4762 | 0.1814 | 1.92286 | 20.9 |
| 19 | -24.5770 | 0.0000 | | |
| 20 | ∞ | d20 | | |
| 21 | 5.5967 | 0.4232 | 1.69680 | 55.5 |
| 22 | -27.1998 | 0.0000 | | |
| 23 | ∞ | d23 | | |
| 24 | ∞ | 0.3492 | | |
| 25 | -3.7235 | 0.4232 | 1.51680 | 64.2 |
| 26 | -2.2669 | 0.0094 | | |
| 27 | -2.1655 | 0.0846 | 2.00100 | 29.1 |
| 28 | 4.7937 | 0.0234 | | |
| 29 | 3.0049 | 0.5042 | 1.59349 | 67.0 |
| 30 | -3.0049 | 0.0208 | | |
| 31 | 4.3016 | 0.0967 | 2.00100 | 29.1 |
| 32 | 2.0822 | 0.0179 | | |
| 33 | 2.2098 | 1.0579 | 1.51860 | 69.9 |
| 34 | -1.6323 | 0.0422 | | |
| 35 | -1.5486 | 0.1149 | 1.87071 | 40.7 |
| 36 | -4.4492 | 0.1833 | | |
| 37 | -11.6706 | 0.7859 | 1.61340 | 44.3 |
| 38 | -2.6720 | 0.0000 | | |
| 39 | ∞ | d39 | | |
| 40 | 8.0841 | 0.3591 | 1.86966 | 20.0 |
| 41 | -14.7292 | 0.0188 | | |
| 42 | ∞ | 2.8713 | 1.51680 | 64.2 |
| 43 | ∞ | 1.1141 | | |
| 44 | ∞ | 0.0000 | | |
| 45 | ∞ | 0.0000 | | |
| IMG | ∞ | 0.0000 | | |

FIG.17

| SURFACE NUMBER | 2 | 3 |
|---|---|---|
| R | -3.0201 | -5.1743 |
| K | -10.1947 | -14.0544 |
| A3 | 2.321080E-02 | 2.335786E-02 |
| A4 | 2.192283E-02 | 4.896099E-02 |
| A5 | -1.061246E-02 | -2.782078E-02 |
| A6 | 9.849219E-04 | 5.019927E-03 |
| A7 | 3.012412E-04 | 2.246962E-04 |
| A8 | -1.523102E-05 | -1.950137E-04 |
| A9 | -1.621524E-05 | -7.910003E-06 |
| A10 | 4.310137E-07 | 1.683064E-05 |
| A11 | 2.293929E-07 | -2.305515E-06 |
| A12 | 5.738188E-08 | -2.143854E-06 |
| A13 | 4.842272E-08 | 8.437799E-07 |
| A14 | -3.730605E-08 | 1.713058E-08 |
| A15 | 1.090808E-08 | -1.903877E-08 |
| A16 | -1.459182E-09 | 2.507641E-09 |
| A17 | 3.505468E-11 | -6.543165E-09 |
| A18 | 1.875819E-12 | 1.761072E-09 |
| A19 | 2.789489E-13 | 1.679903E-11 |
| A20 | 1.123508E-13 | -2.741481E-11 |

FIG.18

|  | Wide | Middle | Tele |
|---|---|---|---|
| f | 1.000 | 1.118 | 1.257 |
| ω | 46.27 | 43.02 | 39.66 |
| Ymax | 1.043 | 1.043 | 1.043 |
| Fno | 1.80 | 1.87 | 1.96 |
| TL | 19.903 | 19.903 | 19.903 |
| BF(in air) | 3.026 | 3.026 | 3.026 |

FIG.19

| GROUP | FIRST SURFACE | f |
|---|---|---|
| G1 | 1 | -1.725 |
| G2 | 16 | 7.653 |
| G3 | 21 | 6.697 |
| G4 | 24 | 18.658 |
| G5 | 40 | 6.046 |
| G1a | 1 | -15.416 |
| G1b | 5 | -3.025 |
| G1c | 8 | -9.800 |

FIG.20A

|     | Wide   | Middle | Tele   |
| --- | ------ | ------ | ------ |
| d0  | 148    | 148    | 148    |
| d15 | 1.5668 | 1.0777 | 0.6582 |
| d20 | 1.8433 | 1.5858 | 1.1671 |
| d23 | 1.5967 | 1.8385 | 2.0903 |
| d39 | 0.0302 | 0.5351 | 1.1215 |

FIG.20B

|     | SHORT RANGE | MEDIUM RANGE | LONG RANGE |
| --- | ----------- | ------------ | ---------- |
| d0  | 59          | 148          | 595        |
| d1  | -0.0337     | 0.0000       | 0.0185     |
| d4  | 0.0337      | 0.0000       | -0.0185    |
| d7  | -0.0660     | 0.0000       | 0.0340     |
| d14 | 0.0660      | 0.0000       | -0.0340    |

FIG.21A

|  | 1G-2G | 2G-3G | 3G-4G | 4G-5G |
|---|---|---|---|---|
| WIDE | 1.5668 | 1.8433 | 1.5967 | 0.0302 |
| TELE | 0.6582 | 1.1671 | 2.0903 | 1.1215 |

FIG.21B

|  | PROJECTION DISTANCE | 1a - 1b | 1b - 1c | 1c - 2G |
|---|---|---|---|---|
| SHORT RANGE | 59 | 0.0337 | -0.0660 | 0.0660 |
| LONG RANGE | 595 | -0.0185 | 0.0340 | -0.0340 |

FIG.22

| VALUE OF CONDITIONAL FORMULA (1) | -15.416 |
|---|---|
| VALUE OF CONDITIONAL FORMULA (2) | -9.800 |
| VALUE OF CONDITIONAL FORMULA (3) | 0.165 |
| VALUE OF CONDITIONAL FORMULA (4) | 20.02 |
| VALUE OF CONDITIONAL FORMULA (5) | 11.35 |
| VALUE OF CONDITIONAL FORMULA (6) | 20.88 |
| VALUE OF CONDITIONAL FORMULA (7) | -0.263 |
| VALUE OF CONDITIONAL FORMULA (8) | -1.725 |
| VALUE OF CONDITIONAL FORMULA (9) | 7.653 |
| VALUE OF CONDITIONAL FORMULA (10) | 81.61 |

FIG.24

| SURFACE NUMBER | R | d | Nd | νd |
|---|---|---|---|---|
| 0 | ∞ | d0 | | |
| 1 | ∞ | d1 | | |
| 2* | -3.0268 | 0.4837 | 1.50940 | 56.5 |
| 3* | -5.3306 | 1.1678 | | |
| 4 | ∞ | d4 | | |
| 5 | 11.5752 | 0.1814 | 1.79360 | 37.1 |
| 6 | 2.0234 | 1.0654 | | |
| 7 | ∞ | d7 | | |
| 8 | -65.9531 | 0.1511 | 1.49700 | 81.6 |
| 9 | 4.2675 | 0.7631 | | |
| 10 | -2.9150 | 0.5003 | 1.49700 | 81.6 |
| 11 | 29.7956 | 0.2807 | | |
| 12 | 180.7901 | 0.7247 | 2.00069 | 25.5 |
| 13 | -6.4453 | 0.0000 | | |
| 14 | ∞ | d14 | | |
| 15 | ∞ | d15 | | |
| 16 | 5.4673 | 0.8162 | 1.71736 | 29.5 |
| 17 | -5.5676 | 0.0235 | | |
| 18 | -5.5648 | 0.1473 | 1.86966 | 20.0 |
| 19 | -31.8281 | 0.0000 | | |
| 20 | ∞ | d20 | | |
| 21 | 5.3979 | 0.4232 | 1.58688 | 42.9 |
| 22 | -37.1913 | 0.0000 | | |
| 23 | ∞ | d23 | | |
| 24 (DIAPHRAGM) | ∞ | 0.2962 | | |
| 25 | -4.7217 | 0.3627 | 1.49700 | 81.6 |
| 26 | -1.8589 | 0.0181 | | |
| 27 | -1.8292 | 0.0846 | 1.90366 | 31.3 |
| 28 | 4.4290 | 0.0243 | | |
| 29 | 2.9671 | 0.5155 | 1.58913 | 61.3 |
| 30 | -3.0146 | 0.0093 | | |
| 31 | 5.6005 | 0.0967 | 1.95375 | 32.3 |
| 32 | 2.1487 | 0.0212 | | |
| 33 | 2.3051 | 0.9431 | 1.51860 | 69.9 |
| 34 | -1.5546 | 0.0299 | | |
| 35 | -1.4982 | 0.0967 | 1.87071 | 40.7 |
| 36 | -4.3091 | 0.3851 | | |
| 37 | -8.7136 | 0.4413 | 1.60311 | 60.7 |
| 38 | -2.3953 | 0.0000 | | |
| 39 | ∞ | d39 | | |
| 40 | 7.7615 | 0.3688 | 1.86966 | 20.0 |
| 41 | -13.4364 | 0.0181 | | |
| 42 | ∞ | 2.8717 | 1.51680 | 64.2 |
| 43 | ∞ | 0.0000 | | |
| 44 | ∞ | 1.1142 | | |
| 45 | ∞ | 0.0000 | | |
| IMG | ∞ | 0.0000 | | |

FIG.25

| SURFACE NUMBER | 2 | 3 |
|---|---|---|
| R | -3.0268 | -5.3306 |
| K | -10.2337 | -14.8663 |
| A3 | 2.332827E-02 | 2.344087E-02 |
| A4 | 2.184022E-02 | 4.921200E-02 |
| A5 | -1.061128E-02 | -2.779218E-02 |
| A6 | 9.813694E-04 | 5.015046E-03 |
| A7 | 3.006527E-04 | 2.238943E-04 |
| A8 | -1.520235E-05 | -1.948370E-04 |
| A9 | -1.618554E-05 | -7.832284E-06 |
| A10 | 4.332992E-07 | 1.685018E-05 |
| A11 | 2.295476E-07 | -2.292018E-06 |
| A12 | 5.729537E-08 | -2.138166E-06 |
| A13 | 4.833298E-08 | 8.433344E-07 |
| A14 | -3.726266E-08 | 1.719175E-08 |
| A15 | 1.088868E-08 | -1.903557E-08 |
| A16 | -1.456883E-09 | 2.491771E-09 |
| A17 | 3.510493E-11 | -6.538573E-09 |
| A18 | 1.908606E-12 | 1.756614E-09 |
| A19 | 3.079886E-13 | 1.674878E-11 |
| A20 | 1.205088E-13 | -2.723713E-11 |

FIG.26

|  | Wide | Middle | Tele |
|---|---|---|---|
| f | 1.000 | 1.118 | 1.252 |
| ω | 46.29 | 43.02 | 39.78 |
| Ymax | 1.043 | 1.043 | 1.043 |
| Fno | 1.80 | 1.87 | 1.96 |
| TL | 19.820 | 19.820 | 19.820 |
| BF(in air) | 3.026 | 3.026 | 3.026 |

FIG.27

| GROUP | FIRST SURFACE | f |
|---|---|---|
| G1 | 1 | -1.852 |
| G2 | 16 | 7.596 |
| G3 | 21 | 8.062 |
| G4 | 24 | 17.904 |
| G5 | 40 | 5.703 |
| G1a | 1 | -14.796 |
| G1b | 5 | -3.116 |
| G1c | 8 | -9.535 |

FIG.28A

|     | Wide   | Middle | Tele   |
|-----|--------|--------|--------|
| d0  | 148    | 148    | 148    |
| d15 | 1.4263 | 0.9358 | 0.5213 |
| d20 | 1.9895 | 1.6728 | 1.2130 |
| d23 | 1.5495 | 1.8518 | 2.1598 |
| d39 | 0.4281 | 0.9330 | 1.4993 |

FIG.28B

|     | SHORT RANGE | MEDIUM RANGE | LONG RANGE |
|-----|-------------|--------------|------------|
| d0  | 59          | 148          | 596        |
| d1  | -0.0270     | 0.0000       | 0.0159     |
| d4  | 0.0270      | 0.0000       | -0.0159    |
| d7  | -0.0945     | 0.0000       | 0.0460     |
| d14 | 0.0945      | 0.0000       | -0.0460    |

FIG.29A

|  | 1G-2G | 2G-3G | 3G-4G | 4G-5G |
|---|---|---|---|---|
| WIDE | 1.4263 | 1.9895 | 1.5495 | 0.4281 |
| TELE | 0.5213 | 1.2130 | 2.1598 | 1.4993 |

FIG.29B

|  | PROJECTION DISTANCE | 1a - 1b | 1b - 1c | 1c - 2G |
|---|---|---|---|---|
| SHORT RANGE | 59 | 0.0270 | -0.0945 | 0.0945 |
| LONG RANGE | 596 | -0.0159 | 0.0460 | -0.0460 |

FIG.30

| VALUE OF CONDITIONAL FORMULA (1) | -14.796 |
|---|---|
| VALUE OF CONDITIONAL FORMULA (2) | -9.535 |
| VALUE OF CONDITIONAL FORMULA (3) | 0.175 |
| VALUE OF CONDITIONAL FORMULA (4) | 20.02 |
| VALUE OF CONDITIONAL FORMULA (5) | 9.48 |
| VALUE OF CONDITIONAL FORMULA (6) | 20.02 |
| VALUE OF CONDITIONAL FORMULA (7) | -0.276 |
| VALUE OF CONDITIONAL FORMULA (8) | -1.852 |
| VALUE OF CONDITIONAL FORMULA (9) | 7.596 |
| VALUE OF CONDITIONAL FORMULA (10) | 81.61 |

FIG.32

| SURFACE NUMBER | R | d | Nd | νd |
|---|---|---|---|---|
| 0 | ∞ | d0 | | |
| 1 | ∞ | d1 | | |
| 2* | -3.2968 | 0.4694 | 1.50940 | 56.5 |
| 3* | -6.1598 | 0.9067 | | |
| 4 | ∞ | d4 | | |
| 5 | 6.0180 | 0.2417 | 1.48749 | 70.4 |
| 6 | 2.0117 | 1.1072 | | |
| 7 | ∞ | d7 | | |
| 8 | -19.0026 | 0.1812 | 1.74950 | 35.3 |
| 9 | 2.8201 | 0.7801 | | |
| 10 | -3.3385 | 1.0573 | 1.49700 | 81.6 |
| 11 | 13.4046 | 0.2380 | | |
| 12 | 51.2924 | 0.7552 | 1.90366 | 31.3 |
| 13 | -5.7243 | 0.0000 | | |
| 14 | ∞ | d14 | | |
| 15 | ∞ | d15 | | |
| 16 | 4.7838 | 0.8792 | 1.71736 | 29.5 |
| 17 | -6.3674 | 0.1472 | 1.84666 | 23.8 |
| 18 | 604.1456 | d18 | | |
| 19 | 4.0211 | 0.4677 | 1.51680 | 64.2 |
| 20 | -27.7388 | 0.0254 | | |
| 21 | ∞ | d21 | | |
| 22 (DIAPHRAGM) | ∞ | 0.0675 | | |
| 23 | -7.9177 | 0.6041 | 1.51680 | 64.2 |
| 24 | -2.1913 | 0.0846 | 1.91650 | 31.6 |
| 25 | 2.1680 | 0.4739 | 1.51680 | 64.2 |
| 26 | -2.9514 | 0.0181 | | |
| 27 | 7.0826 | 0.0967 | 1.80100 | 35.0 |
| 28 | 2.2076 | 0.9830 | 1.53775 | 74.7 |
| 29 | -1.3766 | 0.0483 | 1.90043 | 37.4 |
| 30 | -6.3449 | 0.2533 | | |
| 31 | -19.0538 | 0.5871 | 1.62041 | 60.3 |
| 32 | -2.0546 | d32 | | |
| 33 | 6.7102 | 0.3873 | 1.86966 | 20.0 |
| 34 | -15.3708 | 0.0181 | | |
| 35 | ∞ | 2.8576 | 1.51680 | 64.2 |
| 36 | ∞ | 0.0000 | | |
| 37 | ∞ | 1.1213 | | |
| 38 | ∞ | 0.0000 | | |
| IMG | ∞ | 0.0000 | | |

FIG.33

| SURFACE NUMBER | 2 | 3 |
|---|---|---|
| R | -3.2968 | -6.1598 |
| K | -10.9968 | -14.3867 |
| A3 | 1.789172E-02 | 1.737995E-02 |
| A4 | 2.243735E-02 | 5.008919E-02 |
| A5 | -1.052086E-02 | -2.775077E-02 |
| A6 | 9.669057E-04 | 5.049673E-03 |
| A7 | 2.960219E-04 | 2.283429E-04 |
| A8 | -1.599122E-05 | -1.952860E-04 |
| A9 | -1.624488E-05 | -7.818864E-06 |
| A10 | 4.767619E-07 | 1.698683E-05 |
| A11 | 2.415165E-07 | -2.306448E-06 |
| A12 | 5.955108E-08 | -2.154586E-06 |
| A13 | 4.887294E-08 | 8.510494E-07 |
| A14 | -3.769182E-08 | 1.743815E-08 |
| A15 | 1.096985E-08 | -1.929118E-08 |
| A16 | -1.482302E-09 | 2.507733E-09 |
| A17 | 3.458275E-11 | -6.628939E-09 |
| A18 | 1.928722E-12 | 1.771564E-09 |
| A19 | 3.775852E-13 | 1.698636E-11 |
| A20 | 1.419833E-13 | -2.683444E-11 |

FIG.34

|  | Wide | Middle | Tele |
|---|---|---|---|
| f | 1.000 | 1.118 | 1.252 |
| ω | 46.32 | 43.04 | 39.80 |
| Ymax | 1.042 | 1.042 | 1.042 |
| Fno | 1.80 | 1.86 | 1.93 |
| TL | 19.031 | 19.031 | 19.031 |
| BF(in air) | 3.023 | 3.023 | 3.023 |

FIG.35

| GROUP | FIRST SURFACE | f |
|---|---|---|
| G1 | 1 | -2.026 |
| G2 | 16 | 7.677 |
| G3 | 21 | 6.830 |
| G4 | 24 | 27.341 |
| G5 | 40 | 5.415 |
| G1a | 1 | -14.741 |
| G1b | 5 | -6.324 |
| G1c | 8 | -4.635 |

FIG.36A

|     | Wide   | Middle | Tele   |
| --- | ------ | ------ | ------ |
| d0  | 153    | 153    | 153    |
| d15 | 1.1564 | 0.6138 | 0.1438 |
| d18 | 1.4668 | 1.3156 | 1.0352 |
| d21 | 1.4431 | 1.6835 | 1.9478 |
| d32 | 0.1072 | 0.5606 | 1.0467 |

FIG.36B

|     | SHORT RANGE | MEDIUM RANGE | LONG RANGE |
| --- | ----------- | ------------ | ---------- |
| d0  | 59          | 153          | 622        |
| d1  | -0.1510     | 0.0000       | 0.0725     |
| d4  | 0.1510      | 0.0000       | -0.0725    |
| d7  | -0.0598     | 0.0000       | 0.0256     |
| d14 | 0.0598      | 0.0000       | -0.0256    |

FIG.37A

|       | 1G-2G  | 2G-3G  | 3G-4G  | 4G-5G  |
|-------|--------|--------|--------|--------|
| WIDE  | 1.1564 | 1.4668 | 1.4431 | 0.1072 |
| TELE  | 0.1438 | 1.0352 | 1.9478 | 1.0467 |

FIG.37B

|                | PROJECTION DISTANCE | 1a - 1b | 1b - 1c | 1c - 2G |
|----------------|---------------------|---------|---------|---------|
| SHORT RANGE    | 59                  | 0.1510  | -0.0598 | 0.0598  |
| LONG RANGE     | 622                 | -0.0725 | 0.0256  | -0.0256 |

FIG.38

| VALUE OF CONDITIONAL FORMULA (1) | -14.741 |
|---|---|
| VALUE OF CONDITIONAL FORMULA (2) | -4.635 |
| VALUE OF CONDITIONAL FORMULA (3) | 0.185 |
| VALUE OF CONDITIONAL FORMULA (4) | 20.02 |
| VALUE OF CONDITIONAL FORMULA (5) | 5.72 |
| VALUE OF CONDITIONAL FORMULA (6) | 23.78 |
| VALUE OF CONDITIONAL FORMULA (7) | -0.303 |
| VALUE OF CONDITIONAL FORMULA (8) | -2.026 |
| VALUE OF CONDITIONAL FORMULA (9) | 7.677 |
| VALUE OF CONDITIONAL FORMULA (10) | 81.61 |

FIG.40

| SURFACE NUMBER | R | d | Nd | νd |
|---|---|---|---|---|
| 0 | ∞ | d0 | | |
| 1 | ∞ | d1 | | |
| 2* | -3.0875 | 0.4834 | 1.50940 | 56.5 |
| 3* | -5.3305 | 1.2064 | | |
| 4 | ∞ | d4 | | |
| 5 | 22.5717 | 0.1813 | 1.79360 | 37.1 |
| 6 | 2.1482 | 1.5095 | | |
| 7 | ∞ | d7 | | |
| 8 | -50.6324 | 0.1511 | 1.49700 | 81.6 |
| 9 | 4.8347 | 0.8218 | | |
| 10 | -2.7479 | 0.1691 | 1.49700 | 81.6 |
| 11 | 24.6921 | 0.1530 | | |
| 12 | 84.7113 | 0.4688 | 2.00069 | 25.5 |
| 13 | -5.4886 | 0.0000 | | |
| 14 | ∞ | d14 | | |
| 15 | ∞ | d15 | | |
| 16 | 6.1469 | 0.7852 | 1.75520 | 27.5 |
| 17 | -5.5605 | 0.0604 | | |
| 18 | -5.4109 | 0.1450 | 1.94595 | 18.0 |
| 19 | -22.5381 | 0.0000 | | |
| 20 | ∞ | d20 | | |
| 21 | 5.9817 | 0.3404 | 1.69680 | 55.5 |
| 22 | -22.2320 | 0.0000 | | |
| 23 | ∞ | d23 | | |
| 24 (DIAPHRAGM) | ∞ | 0.4723 | | |
| 25 | -4.0197 | 0.3626 | 1.51680 | 64.2 |
| 26 | -2.0939 | 0.0181 | | |
| 27 | -2.0642 | 0.0846 | 1.90366 | 31.3 |
| 28 | 4.3960 | 0.0181 | | |
| 29 | 3.0139 | 0.5247 | 1.58913 | 61.3 |
| 30 | -3.1324 | 0.0232 | | |
| 31 | 5.1038 | 0.0967 | 1.95375 | 32.3 |
| 32 | 2.1209 | 0.0186 | | |
| 33 | 2.2441 | 0.9427 | 1.51860 | 69.9 |
| 34 | -1.6376 | 0.0336 | | |
| 35 | -1.5693 | 0.0967 | 1.87071 | 40.7 |
| 36 | -5.2032 | 0.3367 | | |
| 37 | -13.5650 | 0.6072 | 1.60311 | 60.7 |
| 38 | -2.6025 | 0.0000 | | |
| 39 | ∞ | d39 | | |
| 40 | 8.4723 | 0.3595 | 1.86966 | 20.0 |
| 41 | -13.5747 | 0.0181 | | |
| 42 | ∞ | 2.8703 | 1.51680 | 64.2 |
| 43 | ∞ | 1.1137 | | |
| 44 | ∞ | 0.0000 | | |
| 45 | ∞ | 0.0000 | | |
| IMG | ∞ | 0.0000 | | |

FIG.41

| SURFACE NUMBER | 2 | 3 |
| --- | --- | --- |
| R | -3.0875 | -5.3305 |
| K | -10.6906 | -14.8044 |
| A3 | 2.296331E-02 | 2.365502E-02 |
| A4 | 2.190284E-02 | 4.863717E-02 |
| A5 | -1.070490E-02 | -2.789766E-02 |
| A6 | 1.002220E-03 | 5.039492E-03 |
| A7 | 3.050307E-04 | 2.295844E-04 |
| A8 | -1.542572E-05 | -1.947187E-04 |
| A9 | -1.642009E-05 | -7.858415E-06 |
| A10 | 3.960943E-07 | 1.685219E-05 |
| A11 | 2.276531E-07 | -2.334274E-06 |
| A12 | 5.859383E-08 | -2.159119E-06 |
| A13 | 4.906702E-08 | 8.460491E-07 |
| A14 | -3.737904E-08 | 1.704882E-08 |
| A15 | 1.097072E-08 | -1.909451E-08 |
| A16 | -1.469136E-09 | 2.555912E-09 |
| A17 | 3.293711E-11 | -6.565829E-09 |
| A18 | 1.268228E-12 | 1.774840E-09 |
| A19 | 2.275786E-13 | 1.688928E-11 |
| A20 | 1.676938E-13 | -2.797591E-11 |

FIG.42

|  | Wide | Middle | Tele |
|---|---|---|---|
| f | 1.000 | 1.119 | 1.252 |
| ω | 46.25 | 42.96 | 39.74 |
| Ymax | 1.042 | 1.042 | 1.042 |
| Fno | 1.80 | 1.87 | 1.95 |
| TL | 19.895 | 19.895 | 19.895 |
| BF(in air) | 3.024 | 3.024 | 3.024 |

FIG.43

| GROUP | FIRST SURFACE | f |
|---|---|---|
| G1 | 1 | -1.769 |
| G2 | 16 | 7.849 |
| G3 | 21 | 6.798 |
| G4 | 24 | 20.746 |
| G5 | 40 | 6.044 |
| G1a | 1 | -15.534 |
| G1b | 5 | -3.003 |
| G1c | 8 | -11.040 |

FIG.44A

|     | Wide   | Middle | Tele   |
|-----|--------|--------|--------|
| d0  | 148    | 148    | 148    |
| d15 | 1.8272 | 1.3241 | 0.9111 |
| d20 | 2.0876 | 1.8539 | 1.4867 |
| d23 | 1.3392 | 1.5943 | 1.8496 |
| d39 | 0.1680 | 0.6497 | 1.1746 |

FIG.44B

|     | SHORT RANGE | MEDIUM RANGE | LONG RANGE |
|-----|-------------|--------------|------------|
| d0  | 59          | 148          | 595        |
| d1  | -0.0302     | 0.0000       | 0.0172     |
| d4  | 0.0302      | 0.0000       | -0.0172    |
| d7  | -0.0793     | 0.0000       | 0.0377     |
| d14 | 0.0793      | 0.0000       | -0.0377    |

FIG.45A

|  | 1G-2G | 2G-3G | 3G-4G | 4G-5G |
|---|---|---|---|---|
| WIDE | 1.8272 | 2.0876 | 1.3392 | 0.1680 |
| TELE | 0.9111 | 1.4867 | 1.8496 | 1.1746 |

FIG.45B

|  | PROJECTION DISTANCE | 1a - 1b | 1b - 1c | 1c - 2G |
|---|---|---|---|---|
| SHORT RANGE | 59 | 0.0302 | -0.0793 | 0.0793 |
| LONG RANGE | 595 | -0.0172 | 0.0377 | -0.0377 |

FIG.46

| VALUE OF CONDITIONAL FORMULA (1) | -15.534 |
|---|---|
| VALUE OF CONDITIONAL FORMULA (2) | -11.040 |
| VALUE OF CONDITIONAL FORMULA (3) | 0.165 |
| VALUE OF CONDITIONAL FORMULA (4) | 23.78 |
| VALUE OF CONDITIONAL FORMULA (5) | 5.72 |
| VALUE OF CONDITIONAL FORMULA (6) | 23.78 |
| VALUE OF CONDITIONAL FORMULA (7) | -0.266 |
| VALUE OF CONDITIONAL FORMULA (8) | -1.769 |
| VALUE OF CONDITIONAL FORMULA (9) | 7.849 |
| VALUE OF CONDITIONAL FORMULA (10) | 81.61 |

FIG.48

| SURFACE NUMBER | R | d | Nd | νd |
|---|---|---|---|---|
| 0 | ∞ | d0 | | |
| 1 | ∞ | d1 | | |
| 2* | -3.0324 | 0.4863 | 1.50940 | 56.5 |
| 3* | -4.5943 | 1.1118 | | |
| 4 | ∞ | d4 | | |
| 5 | 14.2648 | 0.1933 | 1.79360 | 37.1 |
| 6 | 2.1587 | 1.6852 | | |
| 7 | ∞ | d7 | | |
| 8 | -10.4072 | 0.3021 | 1.49700 | 81.6 |
| 9 | 4.3252 | 0.8216 | | |
| 10 | -3.2904 | 0.3021 | 1.55032 | 75.5 |
| 11 | 13.2996 | 0.1050 | | |
| 12 | 24.0277 | 0.4595 | 2.00069 | 25.5 |
| 13 | -6.1517 | 0.0000 | | |
| 14 | ∞ | d14 | | |
| 15 | ∞ | d15 | | |
| 16 | 5.5132 | 0.8156 | 1.73037 | 32.2 |
| 17 | -5.5132 | 0.0604 | | |
| 18 | -5.3642 | 0.1510 | 1.94595 | 18.0 |
| 19 | -15.4027 | 0.0000 | | |
| 20 | ∞ | d20 | | |
| 21 | 5.5725 | 0.4229 | 1.69680 | 55.5 |
| 22 | -28.8738 | 0.0000 | | |
| 23 | ∞ | d23 | | |
| 24 (DIAPHRAGM) | ∞ | 0.3584 | | |
| 25 | -2.7739 | 0.4229 | 1.51680 | 64.2 |
| 26 | -2.6614 | 0.2628 | | |
| 27 | -2.4546 | 0.0846 | 2.00100 | 29.1 |
| 28 | 5.5539 | 0.0075 | | |
| 29 | 2.9086 | 0.5374 | 1.59349 | 67.0 |
| 30 | -2.9086 | 0.0181 | | |
| 31 | 4.7081 | 0.0967 | 2.00100 | 29.1 |
| 32 | 2.0477 | 0.0340 | | |
| 33 | 2.2621 | 0.9059 | 1.51860 | 69.9 |
| 34 | -1.5068 | 0.0181 | | |
| 35 | -1.4650 | 0.1148 | 1.87071 | 40.7 |
| 36 | -4.6294 | 0.0806 | | |
| 37 | -16.8641 | 0.7854 | 1.61340 | 44.3 |
| 38 | -2.6931 | 0.0000 | | |
| 39 | ∞ | d39 | | |
| 40 | 9.9603 | 0.3589 | 1.86966 | 20.0 |
| 41 | -10.9167 | 0.0181 | | |
| 42 | ∞ | 2.8696 | 1.51680 | 64.2 |
| 43 | ∞ | 1.1134 | | |
| 44 | ∞ | 0.0000 | | |
| 45 | ∞ | 0.0000 | | |
| IMG | ∞ | 0.0000 | | |

FIG.49

| SURFACE NUMBER | 2 | 3 |
|---|---|---|
| R | -3.0324 | -4.5943 |
| K | -9.8717 | -10.1713 |
| A3 | 2.003151E-02 | 2.047791E-02 |
| A4 | 2.326929E-02 | 4.977475E-02 |
| A5 | -1.085239E-02 | -2.793605E-02 |
| A6 | 9.965761E-04 | 5.047593E-03 |
| A7 | 3.041287E-04 | 2.326435E-04 |
| A8 | -1.543274E-05 | -1.933689E-04 |
| A9 | -1.654459E-05 | -7.304356E-06 |
| A10 | 4.398111E-07 | 1.703566E-05 |
| A11 | 2.441128E-07 | -2.335040E-06 |
| A12 | 6.094623E-08 | -2.172777E-06 |
| A13 | 4.997595E-08 | 8.460199E-07 |
| A14 | -3.755021E-08 | 1.609898E-08 |
| A15 | 1.095571E-08 | -1.930641E-08 |
| A16 | -1.486783E-09 | 2.562890E-09 |
| A17 | 3.110905E-11 | -6.587893E-09 |
| A18 | 1.097559E-12 | 1.784404E-09 |
| A19 | 2.806050E-13 | 1.812036E-11 |
| A20 | 2.279861E-13 | -2.819416E-11 |

FIG.50

|  | Wide | Middle | Tele |
|---|---|---|---|
| f | 1.000 | 1.118 | 1.252 |
| ω | 46.28 | 42.97 | 39.71 |
| Ymax | 1.042 | 1.042 | 1.042 |
| Fno | 1.80 | 1.87 | 1.96 |
| TL | 19.875 | 19.875 | 19.875 |
| BF(in air) | 3.023 | 3.023 | 3.023 |

FIG.51

| GROUP | FIRST SURFACE | f |
|---|---|---|
| G1 | 1 | -1.650 |
| G2 | 16 | 6.655 |
| G3 | 21 | 6.737 |
| G4 | 24 | 29.844 |
| G5 | 40 | 6.037 |
| G1a | 1 | -19.567 |
| G1b | 5 | -3.228 |
| G1c | 8 | -7.378 |

FIG.52A

|  | Wide | Middle | Tele |
|---|---|---|---|
| d0 | 148 | 148 | 148 |
| d15 | 1.7974 | 1.3079 | 0.8885 |
| d20 | 1.9682 | 1.7454 | 1.3873 |
| d23 | 1.0753 | 1.3146 | 1.5604 |
| d39 | 0.0302 | 0.5034 | 1.0350 |

FIG.52B

|  | SHORT RANGE | MEDIUM RANGE | LONG RANGE |
|---|---|---|---|
| d0 | 59 | 148 | 595 |
| d1 | −0.0489 | 0.0000 | 0.0273 |
| d4 | 0.0489 | 0.0000 | −0.0273 |
| d7 | −0.0471 | 0.0000 | 0.0234 |
| d14 | 0.0471 | 0.0000 | −0.0234 |

FIG.53A

|  | 1G-2G | 2G-3G | 3G-4G | 4G-5G |
|---|---|---|---|---|
| WIDE | 1.7974 | 1.9682 | 1.0753 | 0.0302 |
| TELE | 0.8885 | 1.3873 | 1.5604 | 1.0350 |

FIG.53B

|  | PROJECTION DISTANCE | 1a - 1b | 1b - 1c | 1c - 2G |
|---|---|---|---|---|
| SHORT RANGE | 59 | 0.0489 | -0.0471 | 0.0471 |
| LONG RANGE | 595 | -0.0273 | 0.0234 | -0.0234 |

FIG.54

| VALUE OF CONDITIONAL FORMULA (1) | -19.567 |
|---|---|
| VALUE OF CONDITIONAL FORMULA (2) | -7.378 |
| VALUE OF CONDITIONAL FORMULA (3) | 0.166 |
| VALUE OF CONDITIONAL FORMULA (4) | 20.02 |
| VALUE OF CONDITIONAL FORMULA (5) | 14.25 |
| VALUE OF CONDITIONAL FORMULA (6) | 17.98 |
| VALUE OF CONDITIONAL FORMULA (7) | -0.205 |
| VALUE OF CONDITIONAL FORMULA (8) | -1.650 |
| VALUE OF CONDITIONAL FORMULA (9) | 6.655 |
| VALUE OF CONDITIONAL FORMULA (10) | 75.50 |

FIG.56

| SURFACE NUMBER | R | d | Nd | νd |
|---|---|---|---|---|
| 0 | ∞ | d0 | | |
| 1 | ∞ | d1 | | |
| 2* | -3.0202 | 0.4866 | 1.50940 | 56.5 |
| 3* | -5.1745 | 1.0081 | | |
| 4 | ∞ | d4 | | |
| 5 | 17.1255 | 0.2116 | 1.72916 | 54.7 |
| 6 | 2.3527 | 1.2615 | | |
| 7 | -31.7337 | 0.1511 | 1.72916 | 54.7 |
| 8 | 3.1000 | 3.8281 | | |
| 9 | ∞ | d9 | | |
| 10 | -14.0856 | 0.4232 | 1.49700 | 81.6 |
| 11 | 9.6435 | 0.0806 | | |
| 12 | 18.5005 | 0.4836 | 1.90366 | 31.3 |
| 13 | -11.8289 | 0.0000 | | |
| 14 | ∞ | d14 | | |
| 15 | ∞ | d15 | | |
| 16 | 5.0743 | 0.5900 | 1.74077 | 27.8 |
| 17 | -8.5729 | 0.1511 | | |
| 18 | -6.8772 | 0.1511 | 1.94595 | 18.0 |
| 19 | ∞ | 0.0000 | | |
| 20 | ∞ | d20 | | |
| 21 | 6.7224 | 0.4232 | 1.54072 | 47.2 |
| 22 | -10.9433 | 0.0000 | | |
| 23 | ∞ | d23 | | |
| 24 (DIAPHRAGM) | ∞ | 0.1335 | | |
| 25 | -4.9090 | 0.7859 | 1.49700 | 81.6 |
| 26 | -2.7388 | 0.0085 | | |
| 27 | -2.6080 | 0.0907 | 2.00100 | 29.1 |
| 28 | 3.3796 | 0.0193 | | |
| 29 | 2.7546 | 0.4474 | 1.51742 | 52.2 |
| 30 | -2.7546 | 0.0181 | | |
| 31 | 3.6513 | 0.0997 | 2.00100 | 29.1 |
| 32 | 1.9758 | 0.0143 | | |
| 33 | 2.0650 | 0.8463 | 1.51860 | 69.9 |
| 34 | -1.4552 | 0.0099 | | |
| 35 | -1.4318 | 0.1088 | 1.95375 | 32.3 |
| 36 | -4.7598 | 0.4116 | | |
| 37 | -7.4358 | 0.4842 | 1.56384 | 60.7 |
| 38 | -2.0772 | 0.0000 | | |
| 39 | ∞ | d39 | | |
| 40 | 5.7556 | 0.3434 | 1.86966 | 20.0 |
| 41 | -20.5505 | 0.0181 | | |
| 42 | ∞ | 2.8715 | 1.51680 | 64.2 |
| 43 | ∞ | 1.1142 | | |
| 44 | ∞ | 0.0000 | | |
| 45 | ∞ | 0.0000 | | |
| IMG | ∞ | 0.0000 | | |

FIG.57

| SURFACE NUMBER | 2 | 3 |
|---|---|---|
| R | -3.0202 | -5.1745 |
| K | -10.1947 | -14.0544 |
| A3 | 2.320884E-02 | 2.335589E-02 |
| A4 | 2.192004E-02 | 4.895477E-02 |
| A5 | -1.061066E-02 | -2.781607E-02 |
| A6 | 9.847135E-04 | 5.018865E-03 |
| A7 | 3.011647E-04 | 2.246392E-04 |
| A8 | -1.522651E-05 | -1.949559E-04 |
| A9 | -1.620975E-05 | -7.907325E-06 |
| A10 | 4.308496E-07 | 1.682423E-05 |
| A11 | 2.292958E-07 | -2.304539E-06 |
| A12 | 5.735517E-08 | -2.142856E-06 |
| A13 | 4.839814E-08 | 8.433515E-07 |
| A14 | -3.728553E-08 | 1.712116E-08 |
| A15 | 1.090162E-08 | -1.902749E-08 |
| A16 | -1.458256E-09 | 2.506050E-09 |
| A17 | 3.503095E-11 | -6.538736E-09 |
| A18 | 1.874470E-12 | 1.759806E-09 |
| A19 | 2.787365E-13 | 1.678624E-11 |
| A20 | 1.122605E-13 | -2.739278E-11 |

FIG.58

|       | Wide   | Middle | Tele   |
|-------|--------|--------|--------|
| f     | 0.804  | 0.854  | 0.939  |
| ω     | 48.44  | 46.71  | 44.00  |
| Ymax  | 0.907  | 0.907  | 0.907  |
| Fno   | 1.80   | 1.84   | 1.90   |
| TL    | 20.628 | 20.628 | 20.628 |
| BF(in air) | 3.023 | 3.023 | 3.023 |

FIG.59

| GROUP | FIRST SURFACE | f       |
|-------|---------------|---------|
| G1    | 1             | -1.804  |
| G2    | 16            | 9.793   |
| G3    | 21            | 7.767   |
| G4    | 24            | 87.302  |
| G5    | 40            | 5.202   |
| G1a   | 1             | -15.417 |
| G1b   | 5             | -1.625  |
| G1c   | 10            | 24.531  |

FIG.60A

|     | Wide   | Middle | Tele   |
| --- | ------ | ------ | ------ |
| d0  | 119    | 119    | 119    |
| d15 | 1.0081 | 0.6450 | 0.1215 |
| d20 | 0.1874 | 0.1667 | 0.0612 |
| d23 | 2.2981 | 2.4045 | 2.5873 |
| d39 | 0.0597 | 0.3371 | 0.7833 |

FIG.60B

|     | 756 mm  | 2450 mm | 8006 mm |
| --- | ------- | ------- | ------- |
| d0  | 46      | 119     | 484     |
| d1  | -0.0536 | 0.0000  | 0.0332  |
| d4  | 0.0536  | 0.0000  | -0.0332 |
| d9  | 0.0443  | 0.0000  | -0.0178 |
| d14 | -0.0443 | 0.0000  | 0.0178  |

FIG.61A

|      | 1G-2G  | 2G-3G  | 3G-4G  | 4G-5G  |
|------|--------|--------|--------|--------|
| WIDE | 1.0081 | 0.1874 | 2.2981 | 0.0597 |
| TELE | 0.1215 | 0.0612 | 2.5873 | 0.7833 |

FIG.61B

|             | PROJECTION DISTANCE | 1a - 1b | 1b - 1c | 1c - 2G |
|-------------|---------------------|---------|---------|---------|
| SHORT RANGE | 46                  | 0.0536  | 0.0443  | -0.0443 |
| LONG RANGE  | 484                 | -0.0332 | -0.0178 | 0.0178  |

FIG.62

| VALUE OF CONDITIONAL FORMULA (1) | −19.166 |
|---|---|
| VALUE OF CONDITIONAL FORMULA (2) | 30.496 |
| VALUE OF CONDITIONAL FORMULA (3) | 0.155 |
| VALUE OF CONDITIONAL FORMULA (4) | 20.02 |
| VALUE OF CONDITIONAL FORMULA (5) | 9.78 |
| VALUE OF CONDITIONAL FORMULA (6) | 17.98 |
| VALUE OF CONDITIONAL FORMULA (7) | −0.263 |
| VALUE OF CONDITIONAL FORMULA (8) | −2.243 |
| VALUE OF CONDITIONAL FORMULA (9) | 12.174 |
| VALUE OF CONDITIONAL FORMULA (10) | 81.61 |

PROJECTION ZOOM LENS AND PROJECTION DEVICE

CROSS-REFERENCE TO RELATED APPLICATION

The present application is based on and claims priority under 35 U.S.C. § 119 to Japanese Patent Application No. 2020-167232, filed on Oct. 1, 2020, the contents of which are incorporated herein by reference in their entirety.

BACKGROUND OF THE INVENTION

1. Field of the Invention

This invention relates to a projection zoom lens and a projection device.

2. Description of the Related Art

A projection device for projecting a small original image displayed on an image display surface of an "image display device" such as a liquid crystal display device, a DMD, or the like to a projected surface, such as a screen and the like, is widely known as a projector and the like. Projectors equipped with a "projection zoom lens" are widely used because they can change the size of projection images without being hindered by the distance from the projected surface and are easy to use. The "reduced-side" of the projection zoom lens is on the side of the image display device, and the "enlarged-side" is on the side of the projected surface.

Various types of projection zoom lenses are conventionally known. Among them, those of the "negative lead"-type having "a group of lenses with negative refractive force" on the enlarged-side are widely known because it is easy to achieve optical characteristics suitable for the projection zoom lens such as a wide-angle of view, telecentricity on the reduced-side, long back focus, and the like (Patent Documents 1 to 4 and the like).

Various focusing mechanisms are known for focusing projection images to projected surfaces in response to changes in projection distance. As a focusing mechanism of negative lead-type zoom lenses for projection, conventionally, focusing is performed by displacing the lenses in the enlarged-side "a group of lenses having negative refractive force" and the lenses in the group in the direction of the optical axis. For example, articles disclosed in Patent Documents 1 to 4 are as described above.

[Patent Document 1] Japanese Patent No. 5,253,604
[Patent Document 2] Japanese Patent Application Laid-Open No. 2014-240909
[Patent Document 3] Japanese Patent Application Laid-Open No. 2017-107112
[Patent Document 4] Japanese Patent Application Laid-Open No. 2014-235217

SUMMARY OF THE INVENTION

The object of the present invention is to provide a new, negative lead-type projection zoom lens, and the new, negative lead-type projection zoom lens has a focusing function on a group of lenses having a negative refractive force on the enlarged-side.

Means for Solving Problems

A projection zoom lens is configured by a first group having a negative refractive force, a second group having a positive refractive force, a third group having a positive refractive force, an aperture diaphragm, a fourth group having a positive refractive force, and a fifth group having a positive refractive force. The groups are arranged in the aforementioned order from an enlarged-side to a reduced-side in the projection zoom lens, wherein the reduced-side is a telecentric, wherein the first group is configured by a first sub-lens group having a positive or a negative refractive force, a second sub-lens group having a negative refractive force, and a third sub-lens group having a negative refractive force, wherein the sub-lens groups are arranged sequentially from the enlarged-side to form a focusing group. The second group to the fifth group constitute a zooming group, wherein the focusing group changes a spacing of a group adjacent to the first sub-lens group to the third sub-lens group when changing focus from an infinite distance to a near distance, and wherein the zooming group is configured by at least the second group to the fourth group, each of the second group to the fourth group is moved independently to the enlarged-side when magnifying from a wide-angle end to a telephoto end, thereby perming a zooming.

Effects of the Invention

The present invention is to provide a new, negative lead-type projection zoom lens, and the new, negative lead-type projection zoom lens has a focusing function on a group of lenses having a negative refractive force on the enlarged-side.

BRIEF DESCRIPTION OF THE DRAWINGS

FIG. 8 is a figure illustrating data of the projection zoom lens according to Example 1;

FIG. 9 is a figure illustrating aspherical data of the projection zoom lens according to Example 1;

FIG. 10 is a figure illustrating optical data of the projection zoom lens according to Example 1;

FIG. 11 is a figure illustrating a focal length of each group of the projection zoom lenses according to Example 1;

FIG. 12A is a figure illustrating a variable spacing at a wide-angle end, a middle focal length, and a telephoto end of the projection zoom lens according to the first embodiment;

FIG. 12B is a figure illustrating a variable spacing at a short range, a medium range, and a long range in the focusing;

FIG. 13A is a figure illustrating the group spacing at the wide-angle end and telephoto end in the zooming of the projection zoom lens according to Example 1;

FIG. 13B is a figure illustrating a variable group spacing of the focusing group and the second group at the short range and long range in the focusing;

FIG. 14 is a figure illustrating the values of parameters of the conditional formula in the projection zoom lens according to Example 1;

FIG. 16 is a figure illustrating data of a projection zoom lens according to Example 2;

FIG. 17 is a figure illustrating aspherical data of the projection zoom lens according to Example 2;

FIG. 18 is a figure illustrating optical data of the projection zoom lens according to Example 2;

FIG. 19 is a figure illustrating the focal length of each group of the projection zoom lens according to Example 2;

FIG. 20A is a figure illustrating a variable spacing at a wide-angle end, middle focal length, and a telephoto end of the projection zoom lens according to Example 2;

FIG. 20B is a figure illustrating a variable spacing at a short range, a medium range, and a long range in the focusing;

FIG. 21A is a figure illustrating the group spacing at the wide-angle end and telephoto end in the zooming of the projection zoom lens according to Example 2;

FIG. 21B is a figure illustrating a variable group spacing of the focusing group and the second group at the short range and long range in the focusing;

FIG. 22 is a figure illustrating the values of parameters of the conditional formula in the projection zoom lens according to Example 2;

FIG. 24 is a figure illustrating data of a projection zoom lens according to Example 3;

FIG. 25 is a figure illustrating aspherical data of the projection zoom lens according to Example 3;

FIG. 26 is a figure illustrating optical data of the projection zoom lens according to Example 3;

FIG. 27 is a figure illustrating the focal length of each group of the projection zoom lens according to Example 3;

FIG. 28A is a figure illustrating a variable spacing at a wide-angle end, middle focal length, and a telephoto end of the projection zoom lens according to Example 3;

FIG. 28B is a figure illustrating a variable spacing at a short range, a medium range, and a long range in the focusing;

FIG. 29A is a figure illustrating the group spacing at the wide-angle end and telephoto end in the zooming of the projection zoom lens according to Example 3;

FIG. 29B is a figure illustrating a variable group spacing of the focusing group and the second group at the short range and long range in the focusing;

FIG. 30 is a figure illustrating the values of parameters of the conditional formula in the projection zoom lens according to Example 3;

FIG. 32 is a figure illustrating data of a projection zoom lens according to Example 4;

FIG. 33 is a figure illustrating aspherical data of the projection zoom lens according to Example 4;

FIG. 34 is a figure illustrating optical data of the projection zoom lens according to Example 4;

FIG. 35 is a figure illustrating the focal length of each group of the projection zoom lens according to Example 4;

FIG. 36A is a figure illustrating a variable spacing at a wide-angle end, middle focal length, and a telephoto end of the projection zoom lens according to Example 4;

FIG. 36B is a figure illustrating a variable spacing at a short range, a medium range, and a long range in the focusing;

FIG. 37A is a figure illustrating the group spacing at the wide-angle end and telephoto end in the zooming of the projection zoom lens according to Example 4;

FIG. 37B is a figure illustrating a variable group spacing of the focusing group and the second group at the short range and long range in the focusing;

FIG. 38 is a figure illustrating the values of parameters of the conditional formula in the projection zoom lens according to Example 4;

FIG. 40 is a figure illustrating data of a projection zoom lens according to Example 5;

FIG. 41 is a figure illustrating aspherical data of the projection zoom lens according to Example 5;

FIG. 42 is a figure illustrating optical data of the projection zoom lens according to Example 5;

FIG. 43 is a figure illustrating the focal length of each group of the projection zoom lens according to Example 5;

FIG. 44A is a figure illustrating a variable spacing at a wide-angle end, middle focal length, and a telephoto end of the projection zoom lens according to Example 5;

FIG. 44B is a figure illustrating a variable spacing at a short range, a medium range, and a long range in the focusing;

FIG. 45A is a figure illustrating the group spacing at the wide-angle end and telephoto end in the zooming of the projection zoom lens according to Example 5;

FIG. 45B is a figure illustrating a variable group spacing of the focusing group and the second group at the short range and long range in the focusing;

FIG. 46 is a figure illustrating the values of parameters of the conditional formula in the projection zoom lens according to Example 5;

FIG. 48 is a figure illustrating data of a projection zoom lens according to Example 6;

FIG. 49 is a figure illustrating aspherical data of the projection zoom lens according to Example 6;

FIG. 50 is a figure illustrating optical data of the projection zoom lens according to Example 6;

FIG. 51 is a figure illustrating the focal length of each group of the projection zoom lens according to Example 6;

FIG. 52A is a figure illustrating a variable spacing at a wide-angle end, a middle focal length, and a telephoto end of the projection zoom lens according to Example 6;

FIG. 52B is a figure illustrating a variable spacing at a short range, a medium range, and a long range in the focusing;

FIG. 53A is a figure illustrating the group spacing at the wide-angle end and telephoto end in the zooming of the projection zoom lens according to Example 6;

FIG. 53B is a figure illustrating a variable group spacing of the focusing group and the second group at the short range and long range in the focusing;

FIG. 54 is a figure illustrating the values of parameters of the conditional formula in the projection zoom lens according to Example 6;

FIG. 56 is a figure illustrating data of a projection zoom lens according to Example 7;

FIG. 57 is a figure illustrating aspherical data of the projection zoom lens according to Example 7;

FIG. 58 is a figure illustrating optical data of the projection zoom lens according to Example 7;

FIG. 59 is a figure illustrating the focal length of each group of the projection zoom lens according to Example 7;

FIG. 60A is a figure illustrating a variable spacing at a wide-angle end, middle focal length, and a telephoto end of the projection zoom lens according to Example 7;

FIG. 60B is a figure illustrating a variable spacing at a short range, a medium range, and a long range in the focusing;

FIG. 61A is a figure illustrating the group spacing at the wide-angle end and telephoto end in the zooming of the projection zoom lens according to Example 7;

FIG. 61B is a figure illustrating a variable group spacing of the focusing group and the second group at the short range and long range in the focusing;

FIG. 62 is a figure illustrating the values of parameters of the conditional formula in the projection zoom lens according to Example 7;

DETAILED DESCRIPTION OF THE PREFERRED EMBODIMENTS

Figure 1:
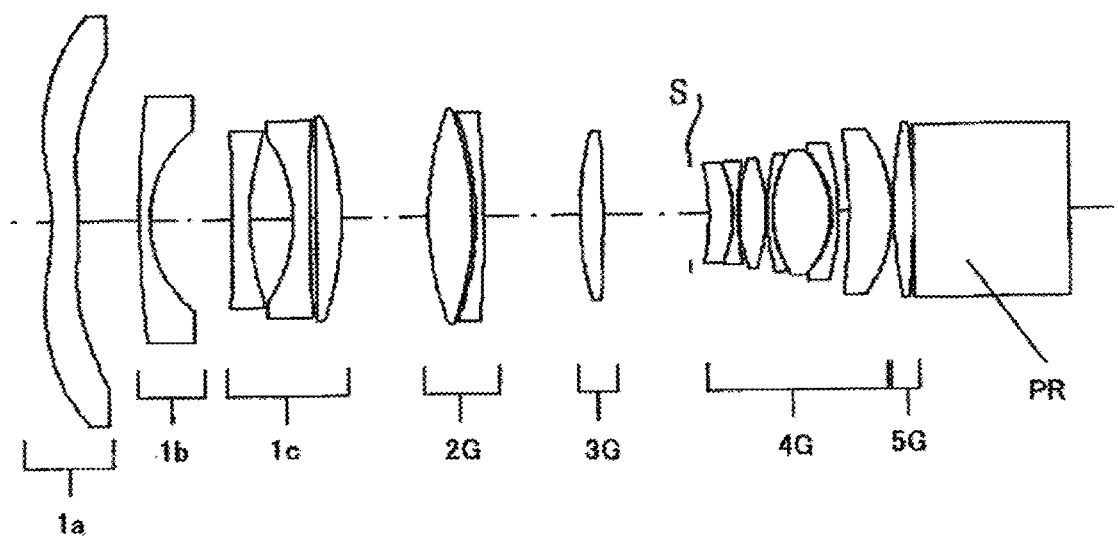
FIG. 1 is a figure illustrating the arrangement of a group of lenses at a wide-angle end and a group of lenses at a telephoto end of a projection zoom lens according to Example 1.
Figure 1:
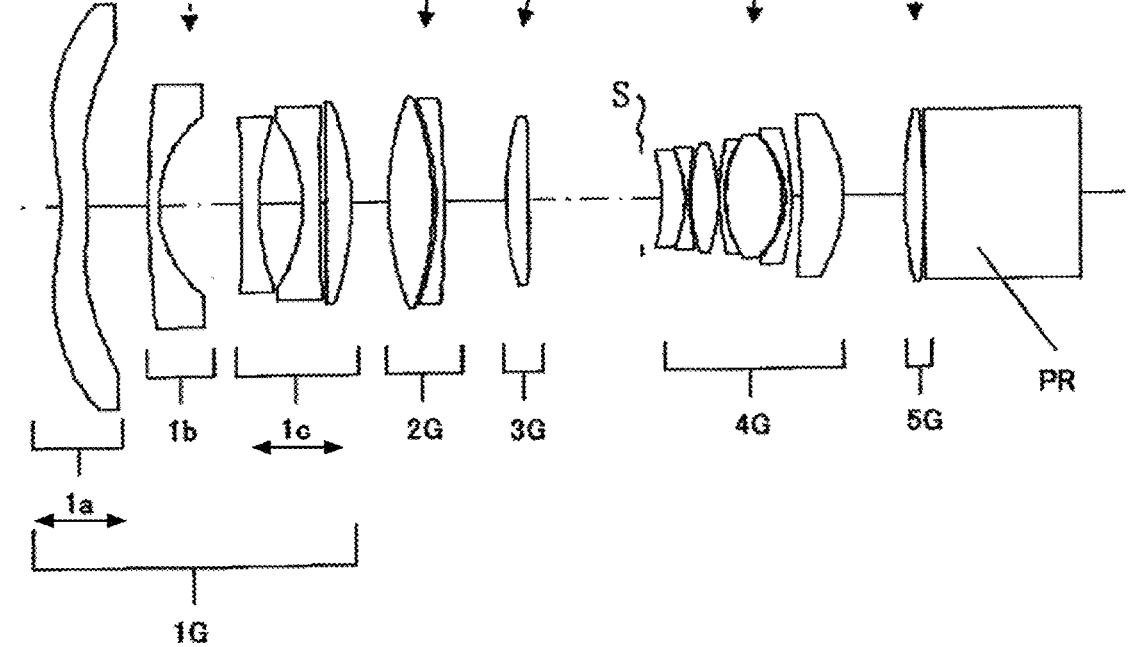

Hereinafter, embodiments of the present invention will be described.

FIGS. 1 to 7 illustrate seven examples of embodiments of the projection zoom lens of the present invention. In these figures, the left side of the figure is the "enlarged-side" and the right side is the "reduced-side". The upper figure illustrated in the figure illustrates the lens arrangement at the wide-angle end and the lower figure illustrated in the figure illustrates the lens arrangement at the telephoto end.

Same reference numerals are used for items that are not likely to be confused in FIGS. 1 to 7. That is, the reference numeral "group i" is represented by the reference numeral iG (i=1 to 5), and "aperture diaphragm" is represented by the reference numeral S. The reference numeral PR is used to designate a "color synthesis prism". The reference numerals 1a, 1b, and 1c represent "first sub-lens group", "second sub-lens group", and "third sub-lens group", respectively.

That is, the projection zoom lens according to the embodiment in FIGS. 1 to 7 is configured by arranging a first group 1G, a second group 2G, a third group 3G, an aperture diaphragm S, a fourth group 4G, and a fifth group 5G in aforementioned order from the enlarged-side to the reduced-side. The first group G1 includes a first sub-lens group 1a, a second sub-lens group 1b, a third sub-lens group 1c, and these sub-lens groups are arranged in the aforementioned order from the enlarged-side to the reduced-side. The first group 1G has a "negative refractive force", and the second group 2G to the fifth group 5G all have "positive refractive force". That is, the projection zoom lens is a "negative-lead type" as in the embodiment illustrated in FIGS. 1 to 7. The first sub-lens group 1a has a "positive or negative refractive force", and both the second sub-lens group 1b and the third sub-lens group 1c have a "negative refractive force". Hereinafter, a "positive refractive force" is expressed as "positive" or a "negative refractive force" is expressed as "negative". Namely, for example, "a first group G1 of a negative refractive force" is simply referred to as a "negative first group G1", and "a first sub-lens group 1a of a negative or positive refractive force" is simply referred to as a "negative or positive first sub-lens group 1a". The projection zoom lens is "telecentric on the reduced-side". The first group 1G which is configured by the first sub-lens group 1a, the second sub-lens group 1b, and the third sub-lens group 1c forms a "focusing group". The focusing group changes the spacing of a group adjacent to the first sub-lens group 1a to the third sub-lens group 1c when changing focus from an infinite distance to a near distance. The second group 2G to the fifth group 5G form a "zooming group". At least the second group 2G to the fourth group 4G independently move to the enlarged-side when magnifying from the wide-angle end to a telephoto end, thereby performing a zooming.

Thus, the projection zoom lens of the present invention is a "negative lead-type" such that the "negative first group 1G" is arranged on the enlarged-side and the "positive second group 2G to the fifth group 5G" are arranged on the reduced-side, and the reduced-side is a telecentric. This configuration can be used to easily achieve performance suitable for a projection zoom lens, such as a wide-angle of view, long back focus, and the like.

The "focusing group" includes three sub-lens groups 1a to 1c. By focusing by "changing the spacing of adjacent groups" of these three sub-lens groups, favorable focusing performance can be achieved in the short range, medium range, and long range. Further, the "zooming group" includes positive "second group 2G to fifth group 5G". At least the second group 2G to the fourth group 4G independently move to the enlarged-side to perform "magnification from the wide-angle end to the telephoto end", thereby achieving favorable optical performance over the entire zoom range. The fifth group 5G can be moved during zooming or can remain at a fixed position as a fixed group.

In FIGS. 1 to 7, the arrows drawn between the upper and lower figures indicate the movement of the first group G1 to the fifth group G5 during zooming from the wide-angle end to the telephoto end. In the embodiments illustrated in FIGS. 1 to 7, the first group G1 and the fifth group 5G do not move during zooming. That is, the first group G1 and the fifth group 5G are "fixed groups". The second group G2, the third group G3, and the fourth group G4 move to the enlarged-side when zooming from the wide-angle end to the telephoto end, thereby changing the "interaction of the space between groups" in these groups G2 to G4. In the examples illustrated in FIGS. 1 to 7, when zooming from the wide-angle end to the telephoto end, the space between the second group G2 and the third group G3 is reduced, and the space between the third group G3 and the fourth group G4 is enlarged. When zooming from the wide-angle end to the telephoto end, the space between the first group G1 and the second group G2 is reduced and the space between the fourth group G4 and the fifth group G5 is enlarged, because the second group G2 to the fourth group G4 move to the "enlarged-side". The fifth group 5G, which is arranged on the most reduced-side, can sufficiently suppress the variation in telecentricity (main light angle) when magnifying by "fixing upon zooming".

As described above, focusing is performed by changing the "spacing of adjacent groups" of the first sub-lens group 1a or the third sub-lens group 1c that constitutes the focusing group. In this case, the focusing from infinity (long range) to near distance (short range) can be performed by setting the first sub-lens group 1a to be negative, fixing the second sub-lens group 1b, and moving the first sub-lens group 1a and the third sub-lens group 1c to the enlarged-side. When focusing is performed as described above, a focal length of the first sub-lens group 1a is f1a (<0), a focal length of the third sub-lens group 1c is f1c (<0), and a focal length of the entire system at the wide-angle end is fw, preferably satisfying the following conditional formulae:

$$-30 < f1a/fw < -5 \quad (1)$$

$$-30 < f1c/fw < -4 \quad (2)$$

If the negative second sub-lens group 1b is fixed and the first sub-lens group 1a and the third sub-lens group 1c are moved, a "different role" can be provided to the first sub-lens group 1a and the third sub-lens group 1c. Therefore, the functionality and convenience by using these first and third sub-lens groups as independent adjustment mechanisms can be improved.

Moving the first sub-lens group 1a is effective for "field curvature correction on mainly around the peripheral portion", and moving the third sub-lens group 1c is effective for "defocusing adjustment from a center to the peripheral portion". When the upper limit of the conditional formula (1) is exceeded, the negative force of the first sub-lens group 1a becomes excessive, and the focus sensitivity of the center portion becomes high. Therefore, the focus of the center portion is easily changed when the field curvature correction of the peripheral portion is performed. When the lower limit of the conditional formula (1) is exceeded, the negative force of the first sub-lens group 1a becomes too small, thereby being disadvantageous to the correction of aberrations at low or medium resolutions.

When the upper limit of the conditional formula (2) is exceeded, the negative force of the third sub-lens group 1c becomes excessive, and the aberration change tends to become large in accordance with focusing. When the lower limit of the conditional formula (2) is exceeded, the negative force of the third sub-lens group 1c becomes underpowered, resulting in "the amount of movement of the third sub-lens group 1c at the time of focusing becomes large", so that the overall length of the projection zoom lens is likely to be excessive.

The fifth group 5G may include "a plurality of lenses containing one or more positive lenses". The fifth group 5G may be preferably configured by having a most reduced lens to be a positive lens. When a focal length of the positive lens is f5, the Abbe number of the lens material is vd5, and a focal length of the entire system at the wide-angle end is fw, preferably satisfying the following conditional formulae:

$$0.1 < fw/f5 < 0.3 \quad (3)$$

$$vd5 < 26 \quad (4)$$

By satisfying the conditional formulae (3) and (4), both the corrections of frame aberration and chromatic aberration can be achieved.

When the upper limit of the conditional formula (3) is exceeded, the refractive force of the entire systems is relatively weakened with respect to the refractive force of the "positive lens at the most reduced-side". Therefore, the achievement of the telecentricity on the reduction side tends to be difficult, and the total length of the lens is likely to be excessive. When the lower limit of the conditional formula (3) is exceeded, the refractive force of the entire system is relatively excessive with respect to the refractive force of the "positive lens at the most reduced-side" and thus various aberrations including frame aberrations tend to be over corrected. When the upper limit of conditional formula (4) is exceeded, favorable correction of chromatic aberration is likely to be difficult.

The second group 2G included in the zooming group has a "positive refractive force" but can include "one or more negative lenses" in addition to the positive lens. Thus, when the second group 2G includes "a positive lens and one or more negative lenses", it is preferable for the following condition formulae to be satisfied:

$$5 < vd2p - vd2n < 15 \quad (5)$$

$$vd2n < 25 \quad (6)$$

In the conditional formulae (5) and (6), "vd2p" is the "Abbe number relative to d-line of positive lens material of the lens on the most reduced-side" among the positive and negative lenses included in the second group 2G. In addition, "vd2n" is the "Abbe number relative to d-line of negative lens material of the lens on the most reduced-side".

Conditional formula (5) regulates the "difference between Abbe numbers relative to the d-line between the negative lens on the most reduced-side and the positive lens on the most reduced-side" in the second group 2G. Accordingly, the negative lens is assumed to be "higher dispersion". Therefore, when adjusting "the difference of the Abbe numbers between the negative lens and the positive lens" is in an appropriate range, a favorable chromatic aberration correction effect can be obtained. If the lower limit of the conditional formula (5) is exceeded, the difference of the Abbe numbers between the "two lenses of positive and negative" becomes small, and there will be insufficient correction of chromatic aberration. If the upper limit of conditional formula (5) is exceeded, the difference of Abbe number is excessive, and excessive correction of aberration is likely to occur.

Among the focusing group (the first group 1G) configured by the first sub-lens group 1a to the third sub-lens group 1c, the lens at the most enlarged-side (the lens arranged closest to the enlarged-side in the first sub-lens group 1a) has two aspherical surfaces, and the following condition formula is preferably satisfied:

$$-0.5 < (L11R1 - L11R2)/(L11R1 + L11R2) < -0.1 \quad (7)$$

"L11R1" in the conditional formula (7) is the radius of curvature of the paraxial axis of the enlarged-side in the two-aspherical surface lens of the first sub-lens group 1a, and "L11R2" is the paraxial radius of curvature of the reduced-side. Satisfying the conditional formula (7) allows favorable correction of a distortion aberration and a frame aberration. When the upper limit of the conditional formula (7) is exceeded, the correction effect of the distortion aberration becomes smaller, and when the lower limit is exceeded, the correction effect of the frame aberration becomes smaller. Among the focusing group configured by the first sub-lens group $1a$ or the third sub-lens group $1c$, the lens arranged at the most enlarged-side is preferably "both sides are aspheric surfaces, concave on the enlarged-side in the paraxial region and convex on the enlarged-side in the peripheral region". In order to correct the frame aberration and the field curvature, the shape of the peripheral portion of the lens arranged on the most enlarged-side is of convex shape on the enlarged-side, and the peripheral light is bent toward the optical axis. In contrast, when the shape at the enlarged-side in the central portion is formed to be concave, it is possible to prevent the surface angle of the peripheral portion from being too large while maintaining the power of the peripheral portion, thereby improving the moldability of the lens surface. In addition, both sides of the lens may be "concave to the enlarged-side" in the extreme peripheral area.

When the focal length of the focusing group (the first group $1G$) is $fg1$, the focal length of the second group $2G$ in the zooming group is $fg2$, and the focal length of the entire system at the wide-angle end is $fw$, the following conditional formulae is preferably satisfied:

$$-2.5 < fg1/fw < -1.5 \quad (8)$$

$$5 < fg2/fw < 12 \quad (9)$$

The focal length "$fg1$" is the "focal length when focusing at infinity". By satisfying these conditional formulae (8) and (9), miniaturization of the lens can be achieved while maintaining the back focus of the projection zoom lens for a long time. When the parameter of the conditional formula (8) is large (or small), the negative refractive force of the first group $1G$ increases (or decreases). When the upper limit of the conditional formula (8) is exceeded, excessive correction of aberration is likely to occur. In addition, when the lower limit is exceeded, securing long back focus is likely to be difficult. When the parameters of the conditional formula (9) are large (or small), the refractive force of the zooming group ($2G$ to $5G$) decreases (or increases). When the upper limit of the conditional formula (9) is exceeded, the amount of movement of the zooming group at the time of magnification increases as the positive refractive force decreases, so that the total length of the lens tends to be long. When the lower limit of the conditional formula (9) is exceeded, the positive refractive force becomes excessive, and excessive correction of aberration is likely to occur.

The third sub-lens group $1c$ can have "a plurality of lenses including a negative lens". When the Abbe number of the negative lens material on the most reduced-side is "$vd1c$", the following conditional formula is preferably satisfied:

$$vd1c > 70 \quad (10)$$

"Low dispersion glass satisfying conditional formula (10)" is used as the "most reduced negative lens" to be moved during focusing, thereby allowing favorable chromatic aberration correction over the entire focusing range.

The embodiments illustrated in FIGS. 1 to 6 indicate the preferred configuration of the first sub-lens group $1a$, the second sub-lens group $1b$, and the third sub-lens group $1c$ that constitute the focusing group. That is, as in the embodiments illustrated in FIGS. 1 to 6, the first sub-lens group $1a$ and the second sub-lens group $1b$ are both configured by "one negative lens," and the third sub-lens group $1c$ can be "a configuration including three lenses arranged with a negative lens, a negative lens, and a positive lens from the enlarged-side".

Figure 7:
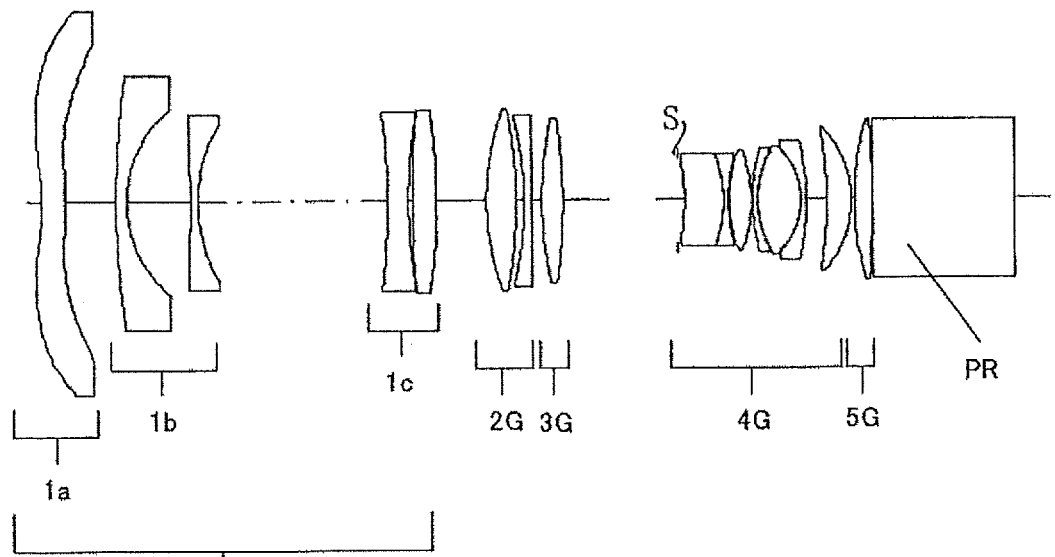
FIG. 7 is a figure illustrating the arrangement of a group of lenses at a wide-angle and a group of lenses at a telephoto end of the projection zoom lens according to the Example 7.
Figure 7:
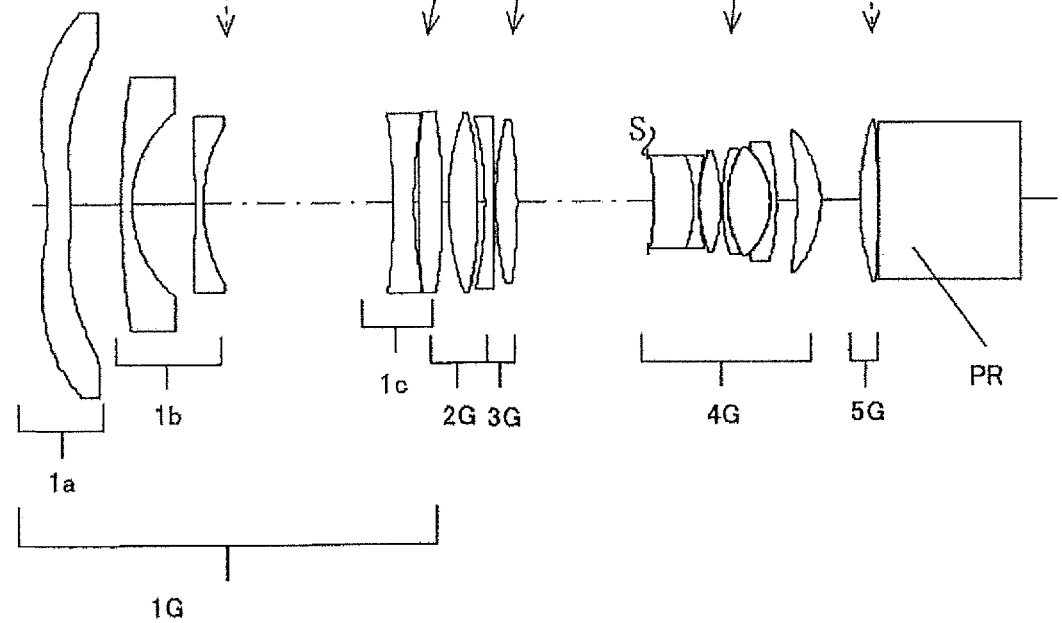

Alternatively, as in the embodiment illustrated in FIG. 7, the first sub-lens group $1a$ in the first group $1G$ may be configured by one negative lens, the second sub-lens group $1b$ may be configured by two negative lenses, and the third sub-lens group $1c$ may be configured by one negative lens and one positive lens in this order from the enlarged-side.

In Example 1 and Example 7, which will be described later, the first sub-lens group $1a$ of both Examples 1 and 7 have the same lens. In Example 1 and Example 7, the lens configurations of the second sub-lens group $1b$ and the third sub-lens group $1c$ are different, and each lens in the second group $G2$ to the fifth group $5G$ is different. As described above, two or more types of projection zoom lenses having different focal lengths can be achieved by sharing the first sub-lens group $1a$ and changing the "configuration of the second sub-lens group and the other sub-lens groups". In other words, when developing two or more types of projection zoom lenses, by sharing the first sub-lens group $1a$, the initial investment cost of the development can be reduced. As described above, the fifth group $5G$ can be configured by a plurality of lenses including one or more lenses having positive refractive force, but the fifth group $5G$ may also be configured using "only one positive lens".

By using the projection zoom lens as described above, a novel projection device can be configured that can change the size of the projecting image without being hindered by the distance from the projected surface.

EXAMPLES

Hereinafter, specific examples of a projection zoom lens are given below. Examples 1 to 7 described below are, in this order, examples of the embodiments illustrated in FIGS. 1 to 7.

Example 1

Example 1 is an example illustrated in FIG. 1, and its configuration is as described above. The data of Example 1 is illustrated in FIG. 8. In FIG. 8, the "surface number" in the left column represents the number of the plane containing the aperture from the projected surface on the enlarged-side to the image display surface on the reduced-side. The surface (plane) number "0" is a "projected surface", and the surface (plane) number "IMG" is an "image display surface". The surface (plane) numbers "40 and 41" are "prismatic surfaces of color synthesis prism PR".

The "virtual plane" is set to make it easier to see the "change of space between planes due to zooming" and the "change of space between planes due to focusing" of the projection zoom lens. That is, surface number "1" and surface number "14" in the surface numbers in FIG. 8 are virtual planes. In this way, the space between the surface number including the virtual plane "0" to the surface number "IMG" is set to "d (d0 to dIMG)" as illustrated in the figure. Throughout all embodiments, the "unit of quantity having a dimension of length" is "mm" unless otherwise indicated.

In FIG. 8, the "R" column indicates the radius of curvature of each surface number including "virtual plane and aperture plane" (or "paraxial curvature radius" for aspheric surfaces). The "Nd and vd" is the "refractive index and Abbe number with respect to d line" of the material of the lens.

In the surface number, "surface (plane) marked with an asterisk" is an aspherical surface. In the following Examples, aspheric surfaces are represented by the following well known formulae:

$$Z=(h^2/R)/[1+\sqrt{(1-(1+k)(h/R)^2}]+\Sigma Ai \cdot h^i (i=1 \text{ to } 20)$$

In this formula, "Z" is the aspheric mass, "R" is the paraxial curvature radius, "h" is the distance from the optical axis at the aspheric surface, "K" is the conical constant, and "Ai (i=1 to 20)" is the first-to-twentieth order aspheric coefficient.

[Data of Aspheric Surface]

FIG. 9 indicates data of the aspheric surfaces of the projection zoom lens in Example 1. For example, "2.320884E-02" means "2.320884E-02×10$^{-2}$" in the aspherical data indicated in FIG. 9. The same applies to the following other Examples.

In FIG. 10, "optical data" at the wide-angle end (Wide), the middle focal length (Middle), and the telephoto end (Tele) of the projection zoom lens in Example 1 are illustrated. The "optical data" includes a focal length "f", a field angle "ω (degrees)", a maximum object height "Ymax", a F number "Fno", a total length "TL", and an air-converted back focus "BF (in air)".

FIG. 11 indicates the focal length of each group in Example 1. In this figure, "f" is the focal length of each group, and the first group 1G to the fifth group 5G are indicated as G1 to G5. In addition, G1a, G1b, and G1c refers to the first sub-lens group 1a, the second sub-lens group 1b, and the third sub-lens group 1c, respectively. "First surface" is the surface number on the most enlarged-side among these groups.

FIG. 12A indicates the wide-angle end (Wide), the middle focal length (Middle), and the telephoto end (Tele) due to the change of plane spacing in accordance of zooming. Zooming is achieved by moving the second group G2 to the fourth group G4, so that the plane spacings such as 15, 20, 23, and 39 change. FIG. 12B indicates the short range, medium range, and long range due to the change of plane spacing according to focusing. The "short range" is a lens arrangement of the focusing group when focusing to the short range in the group arrangement at the wide-angle end. The "long range" is a lens arrangement of the focusing group when focusing infinitely in the group arrangement at the telephoto end. The "medium range" is the lens arrangement of the focusing group at the middle focal length. This arrangement is a "reference arrangement" and each sub-lens group in the focusing group is not displaced by the aforementioned "virtual plane (surface numbers "1" and "14" in Example 1)".

In focusing, the spacing of the first sub-lens group 1a, the second sub-lens group 1b, and the third sub-lens group 1c in the first group 1G changes. Therefore, the plane spacings "d0, d1, d4, d7, and d14" change. The "medium range" in focusing is the "reference state of focusing" in which the focusing is not performed. In this state, the plane spacings "d1, d4, d7, and d14" are all 0. In this case, the value of the plane spacing "d0" is the same as "d0" in FIG. 12A.

In the "short range", the projection zoom lens is a group arrangement of the wide-angle end, d0 becomes 59 mm, and the first sub-lens group 1a moves to the enlarged-side so that the d1 becomes −0.0317 mm. This value equals the increment of plane spacing d4 as +0.0317 mm. Similarly, the third sub-lens group 1c moves to the enlarged-side so that the plane spacing d7 becomes −0.0709 mm. This value equals an increment of the plane spacing d14 as +0.0709 mm.

In the "long range", the projection zoom lens is arranged in a group of the telephoto end. The plane spacing d0 between the projected surface (surface number: 0) and the virtual surface (surface number: 1) expands to d0=595 mm, and the first sub-lens group 1a moves to the reduced-side to d1=0.0183 mm. This value equals to the reduced amount of plane spacing d4: −0.0183. Similarly, the third sub-lens group 1c moves to the reduced-side, and the plane spacing: d7 becomes d7=+0.0339 mm. This value equals to the plane spacing corresponding to the virtual surface of surface number 14, such as, the reduced amount of d14=−0.00339 mm.

FIG. 13A indicates the "wide-angle end and telephoto end" of the "spacing between adjacent groups" of the first group 1G, the second group 2G, the third group 3G, the fourth group 4G, and the fifth group 5G associated with zooming. Furthermore, FIG. 13B indicates the "wide-angle end and telephoto end" of the changes in the plane spacing of the first sub-lens group 1a, the second sub-lens group 1b, and the third sub-lens group 1c, and also indicates the "wide-angle end and telephoto end" of the changes in the plane spacing between the third sub-lens group 1c and the second group 2G.

Figure 15A:
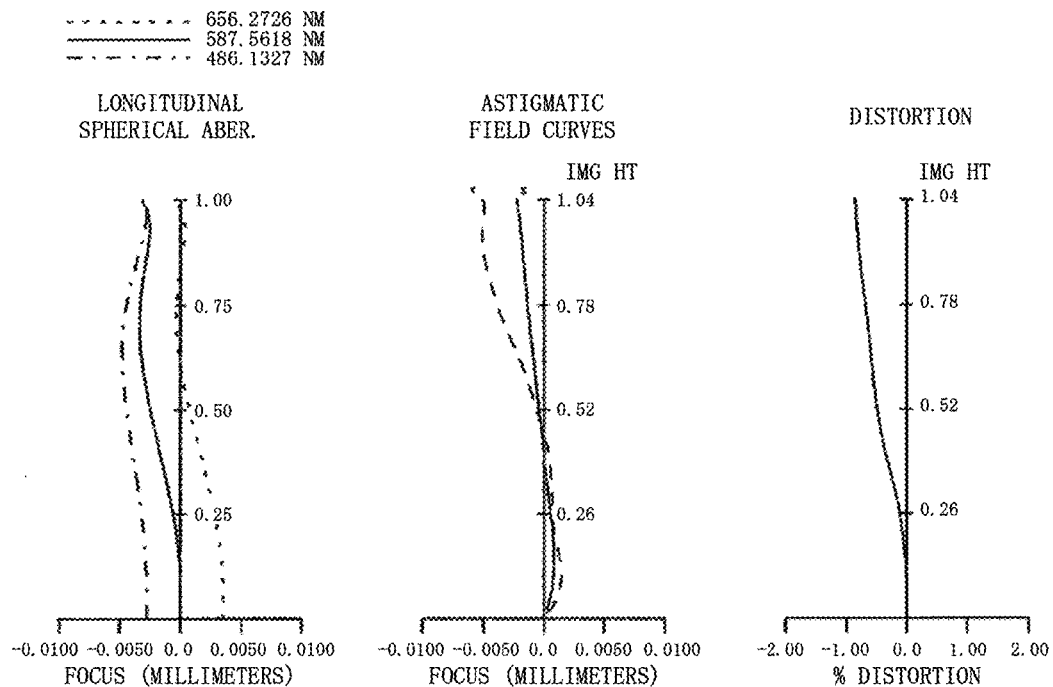
FIG. 15A is an aberration figure of the projection zoom lens according to Example 1.
Figure 15B:
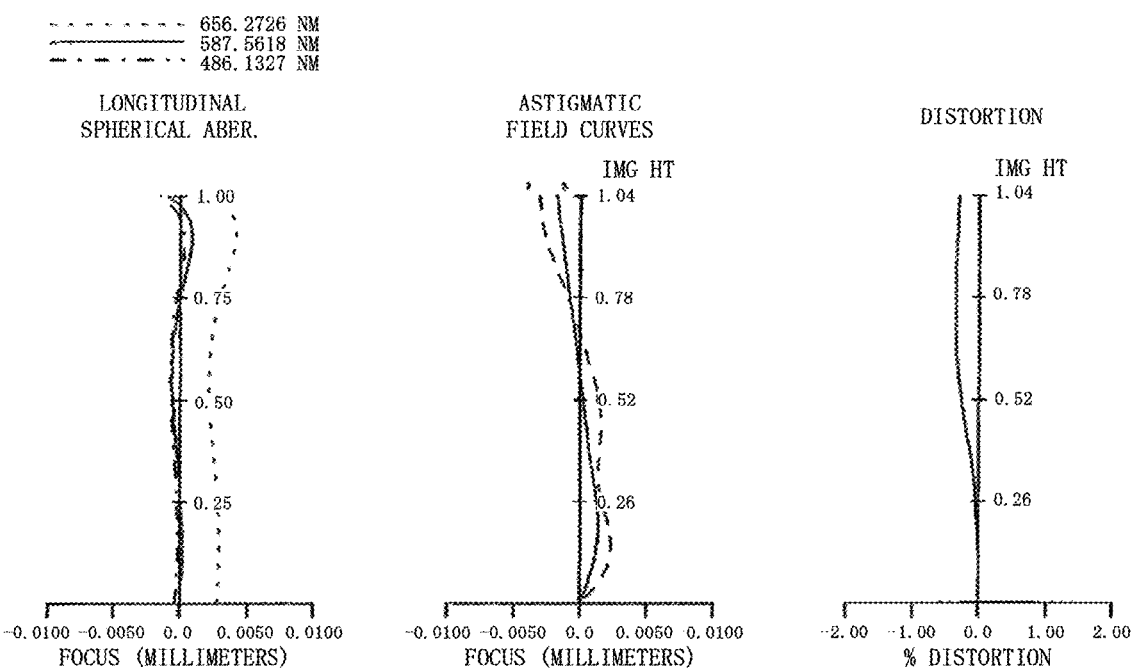
FIG. 15B is an aberration figure of the projection zoom lens according to Example 1.

FIG. 14 indicates the values of each parameter of the conditional formulae (1) to (10) for the projection zoom lens of Example 1. The projection zoom lens of Example 1 satisfies the conditional formulae (1) to (10). FIG. 15 indicates an aberration figure of the projection zoom lens of Example 1. FIG. 15A is an aberration figure at the wide-angle end and FIG. 15B is an aberration figure at the telephoto end. The solid lines in the astigmatism figure represent Sagittal rays and the dashed lines represent meridional rays. As illustrated in each aberration figure, Example 1 exhibits excellent performance.

Example 2

Figure 2:
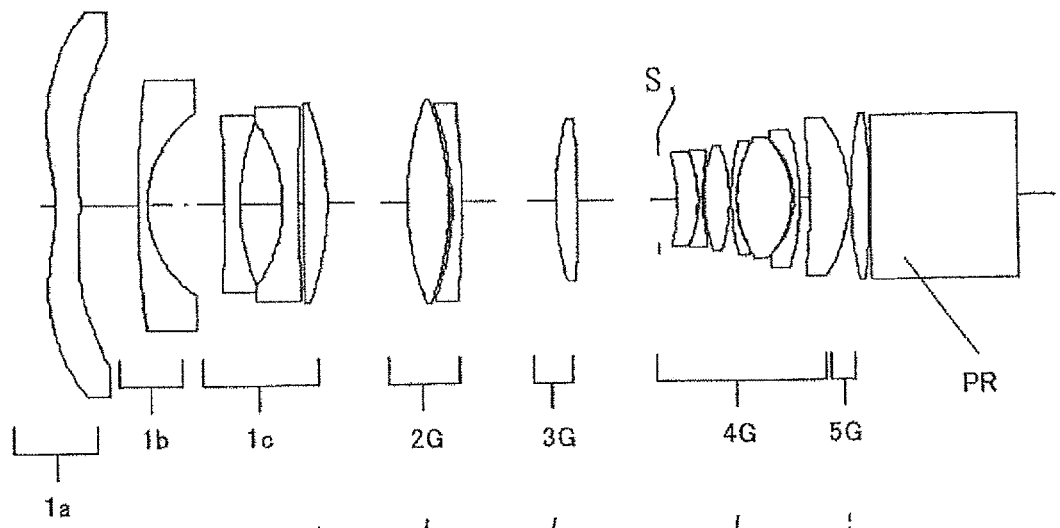
FIG. 2 is a figure illustrating the arrangement of a group of lenses at a wide-angle end and a group of lenses at a telephoto end of the projection zoom lens according to Example 2.
Figure 2:
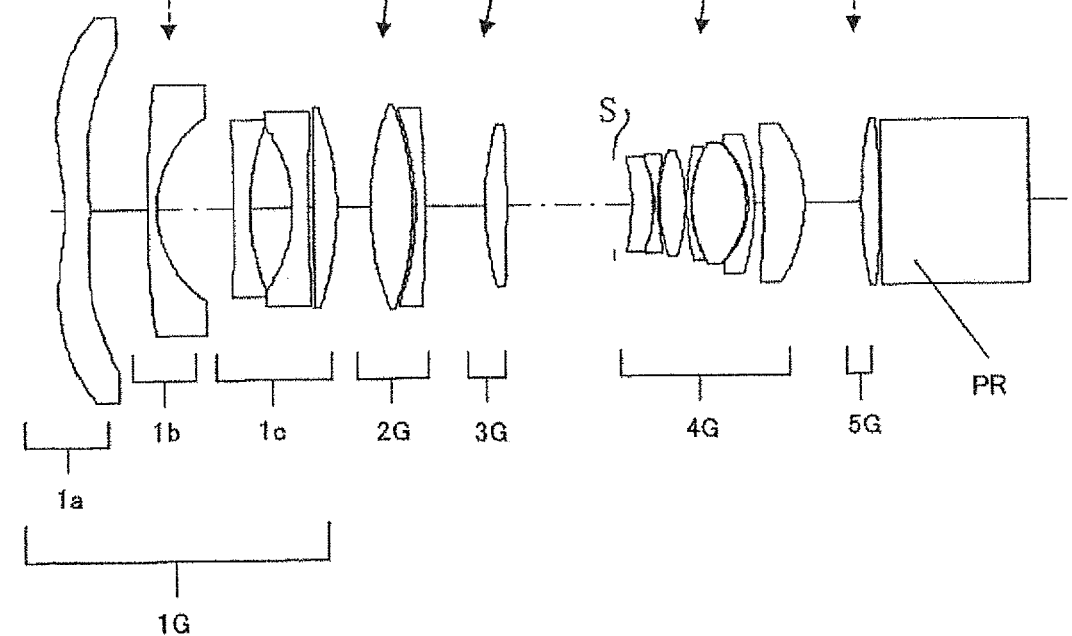

Example 2 is an example illustrated in FIG. 2, and the configuration is as described above. The data of Example 2 is illustrated in FIG. 16 in a similar manner as in FIG. 8 illustrating the data of Example 1. In FIG. 16, the surface number "0" is a "projected plane" and the surface number "IMG" is an "image display plane". In FIG. 16, virtual planes (surface numbers "1" and "14") are also set to facilitate viewing of "a change in plane spacing caused by zooming" and "a change in plane spacing caused by focusing" of the projection zoom lens.

The plane spacing between the surface number including the virtual plane "0" and the surface number "IMG" is set as the plane spacing "d (d0 to dIMG)" as illustrated in the figures. The surface numbers 40 and 41 are "prismatic surfaces of color synthesis prism PR".

[Data of Aspheric Surface]

FIG. 17 indicates data of the aspheric surfaces of the projection zoom lens of Example 2.

In FIG. 18, "optical data" at the wide-angle end (Wide), the middle focal length (Middle), and the telephoto end (Tele) of the projection zoom lens in Example 2 are illustrated in a similar manner as in FIG. 10. In FIG. 19, the focal length of each group in Example 2 is illustrated in a similar manner as in FIG. 11.

FIG. 20A indicates the wide-angle end (Wide), the middle focal length (Middle), and the telephoto end (Tele) due to the change of plane spacing according to zooming. FIG. 20B indicates the short range, medium range, and long range due to the change of plane spacing according to focusing. FIG. 21A indicates the "wide-angle end and telephoto end" of the spacing between adjacent groups of the first group 1G, the second group 2G, the third group 3G, the fourth group 4G, and the fifth group 5G according to zooming. FIG. 21B indicates the "short range and long range" of the changes in spacing, according to focusing, of the first sub-lens group 1a, the second sub-lens group 1b, and the third sub-lens group 1c; and of the changes in plane spacing, according to focusing, of the third sub-lens group 1c and the second group 2G.

Figure 23A:
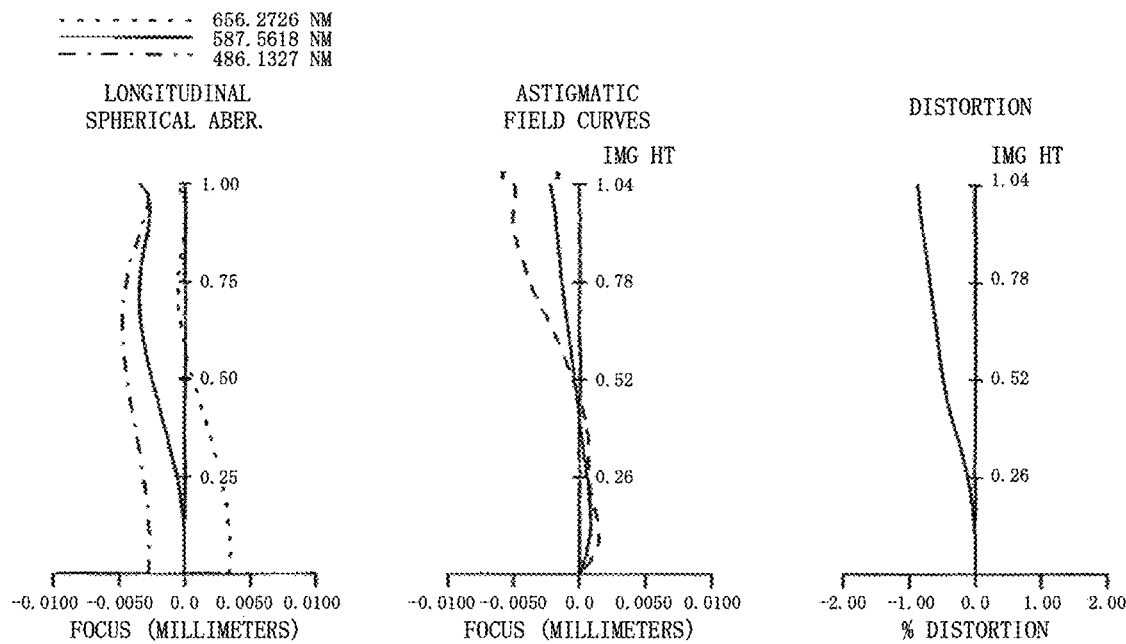
FIG. 23A is an aberration figure of the projection zoom lens according to Example 2.
Figure 23B:
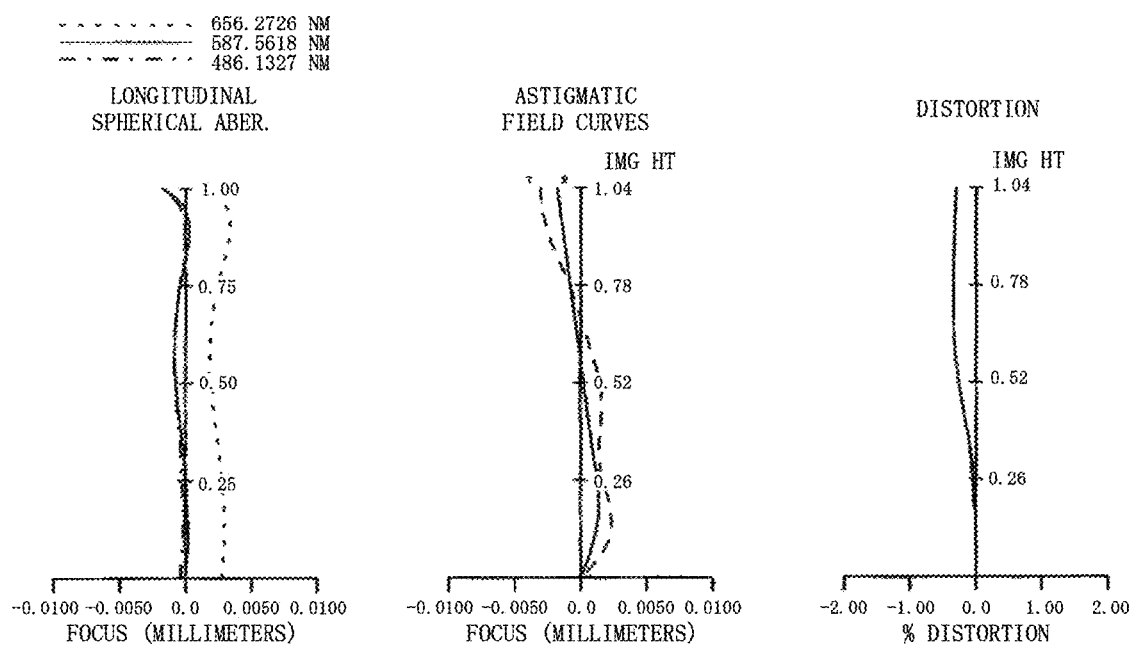
FIG. 23B is an aberration figure of the projection zoom lens according to Example 2.

FIG. 22 indicates the values of each parameter of the conditional formulae (1) to (10) for the projection zoom lens of Example 2. The projection zoom lens of Example 2 satisfies the conditional formulae (1) to (10). FIG. 23 indicates an aberration figure of the projection zoom lens of Example 2, in a similar manner as illustrated in FIG. 15.

As illustrated in each aberration figure, Example 2 exhibits excellent performance.

Example 3

Figure 3:
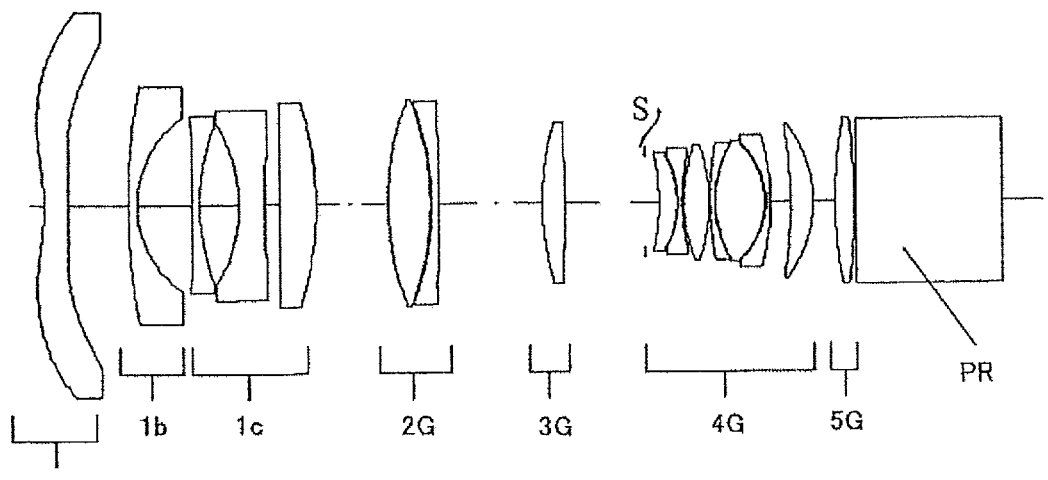
FIG. 3 is a figure illustrating the arrangement of a group of lenses at a wide-angle and a group of lenses at a telephoto end of the projection zoom lens according to the Example 3.
Figure 3:
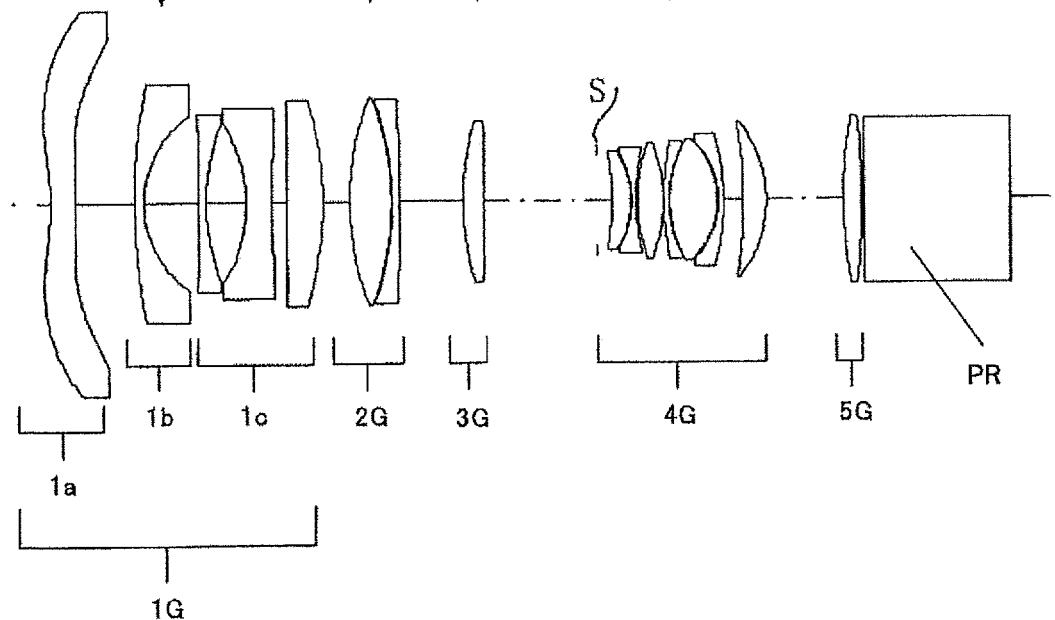

Example 3 is an example illustrated in FIG. 3, and the configuration is as described above. The data of Example 3 is indicated in FIG. 24 in a similar manner as illustrated in FIG. 8. In FIG. 24, the surface number "0" is a "projected plane" and the surface number "IMG" is an "image display plane". In the same manner as Examples 1 and 2, Example 3 includes virtual planes (surface numbers "1" and "15"). The plane spacing between the surface number including the virtual plane "0" and the surface number "IMG" is set as the plane spacing "d (d0 to dIMG)" as illustrated in the figures. The surface numbers "42 and 43" are "prismatic surfaces of color synthesis prism PR". Furthermore, the plane numbers "44 and 45" are cover glass planes provided on the image display of the image display device.

[Data of Aspheric Surface]

FIG. 25 indicates data of the aspheric surfaces of the projection zoom lens of Example 3.

In FIG. 26, "optical data" at the wide-angle end (Wide), the middle focal length (Middle), and the telephoto end (Tele) of the projection zoom lens in Example 3 are illustrated in a similar manner as in FIG. 10. In FIG. 27, the focal length of each group in Example 3 is illustrated in a similar manner as in FIG. 11.

FIG. 28A indicates the wide-angle end (Wide), the middle focal length (Middle), and the telephoto end (Tele) due to the change of plane spacing in accordance of zooming. Zooming is achieved by moving the second group G2 to the fourth group G4, so that the plane spacings such as 15, 20, 23, and 39 change. The change in plane "d0" between a target surface (surface number "0") and a virtual surface "1" is constant. FIG. 28B indicates the short range, medium range, and long range due to the change of plane spacing according to focusing. Focusing is achieved by moving the spacing of planes in the first sub-lens group 1a, the second sub-lens group 1b, and the third sub-lens group 1c in the first group 1G. Therefore, the plane spacings such as d0, d1, d4, and d14 change. FIG. 29A indicates the "wide-angle end and telephoto end" of the spacing between adjacent groups of the first group 1G, the second group 2G, the third group 3G, the fourth group 4G, and the fifth group 5G according to zooming. FIG. 29B indicates the "short range and long range" of the changes in spacing, according to focusing, of the first sub-lens group 1a, the second sub-lens group 1b, and the third sub-lens group 1c; and of the changes in plane spacing, according to focusing, of the third sub-lens group 1c and the second group 2G.

Figure 31A:
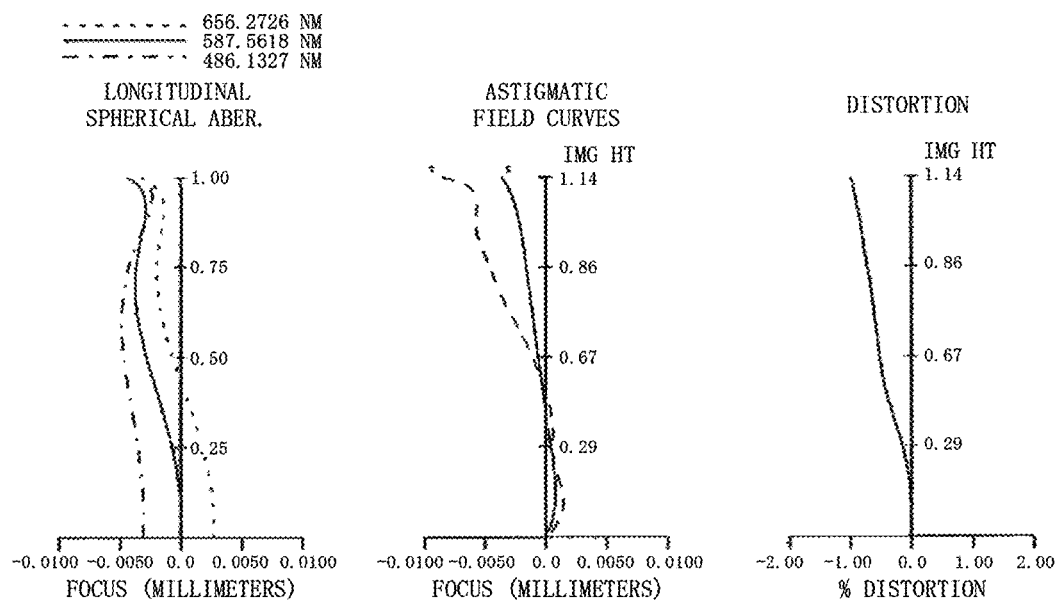
FIG. 31A is an aberration figure of the projection zoom lens according to Example 3.
Figure 31B:
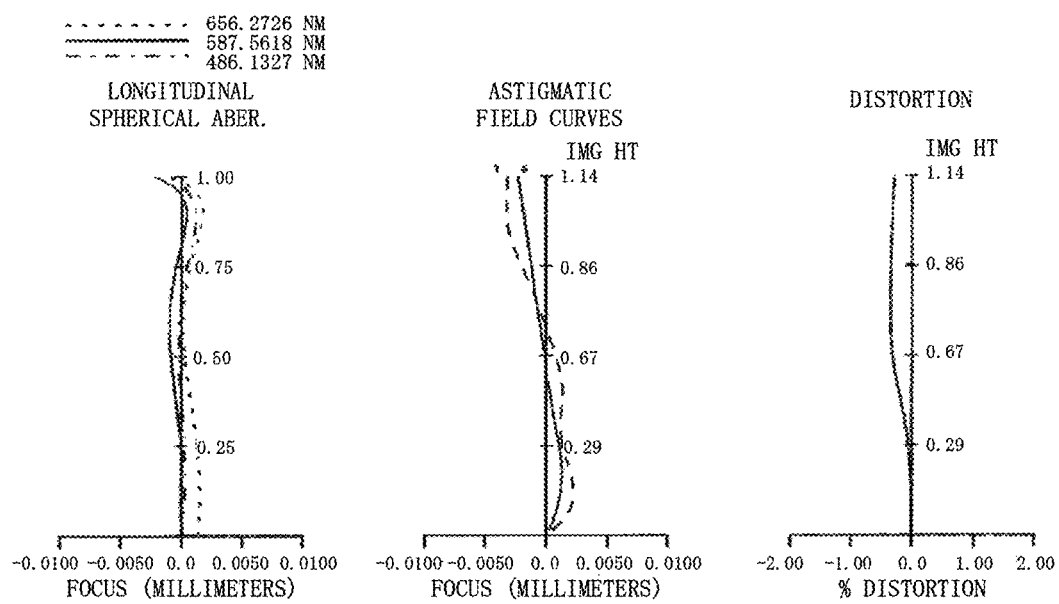
FIG. 31B is an aberration figure of the projection zoom lens according to Example 3.

FIG. 30 indicates the values of each parameter of the conditional formulae (1) to (10) for the projection zoom lens of Example 3. The projection zoom lens of Example 3 satisfies the conditional formulae (1) to (10). FIG. 31 indicates the aberration figure of the projection zoom lens of Example 3 as illustrated in a similar manner as in FIG. 15.

As illustrated in each aberration figure, Example 3 exhibits excellent performance.

Example 4

Figure 4:
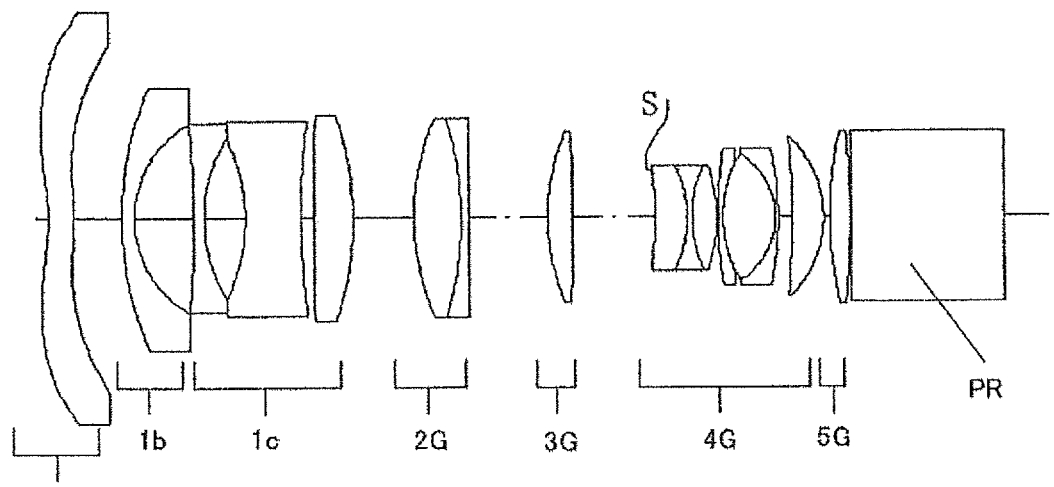
FIG. 4 is a figure illustrating the arrangement of a group of lenses at a wide-angle and a group of lenses at a telephoto end of the projection zoom lens according to the Example 4.
Figure 4:
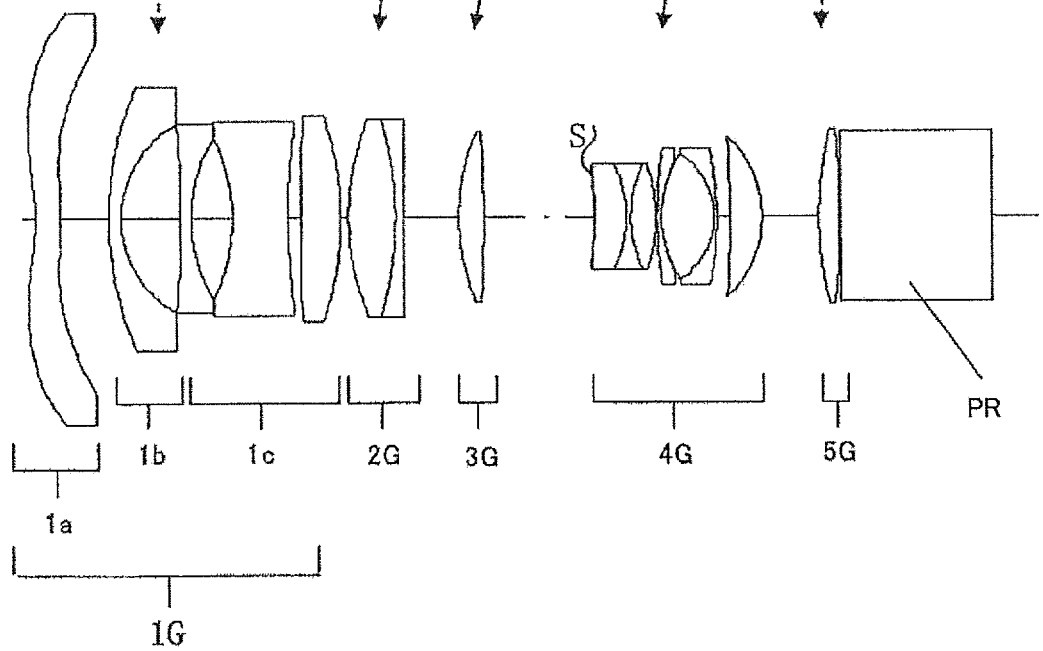

Example 4 is an example illustrated in FIG. 4, and the configuration is as described above. The data of Example 4 is indicated in FIG. 32 in a similar manner as illustrated in FIG. 8. In FIG. 32, the surface number "0" is a "projected plane" and the surface number "IMG" is an "image display plane". In the same manner as Examples 1 to 3, Example 4 includes virtual planes (surface numbers "1" and "14"). The plane spacing between the surface number including the virtual plane "0" and the surface number "IMG" is set as the plane spacing "d (d0 to dIMG)" as illustrated in the figures. The surface numbers "35 and 36" are "prismatic surfaces of color synthesis prism PR". Furthermore, the plane numbers "37 and 38" are cover glass planes provided on the image display of the image display device.

[Data of Aspheric Surface]

FIG. 33 indicates data of the aspheric surfaces of the projection zoom lens of Example 4.

In FIG. 34, "optical data" at the wide-angle end (Wide), the middle focal length (Middle), and the telephoto end (Tele) of the projection zoom lens in Example 4 are illustrated in a similar manner as in FIG. 10. In FIG. 35, the focal length of each group in Example 4 is illustrated in a similar manner as in FIG. 11.

FIG. 36A indicates the wide-angle end (Wide), the middle focal length (Middle), and the telephoto end (Tele) due to the change of plane spacing according to zooming. Zooming is achieved by moving the second group G2 to the fourth group G4, so that the plane spacings such as 15, 18, 21, and 32 change. The change in plane spacing "d0" between a target surface (surface number "0") and a virtual surface "1" is constant (153 mm). FIG. 36B indicates the short range, medium range, and long range due to the change of plane spacing according to focusing. Focusing is achieved by moving the spacing of planes in the first sub-lens group 1a, the second sub-lens group 1b, and the third sub-lens group 1c in the first group 1G. Therefore, the plane spacings such as d0, d1, d4, d7, and d14 change. FIG. 37A indicates "wide-angle end and telephoto end" of the spacing between adjacent groups of the first group 1G, the second group 2G, the third group 3G, the fourth group 4G, and the fifth group 5G according to zooming, in a similar manner as in FIG. 13.

FIG. 37B indicates the "short range and long range" of the changes in spacing, associated with focusing, of the first sub-lens group 1a, the second sub-lens group 1b, and the third sub-lens group 1c; and of the changes in plane spacing, associated with focusing, of the third sub-lens group 1c and the second group 2G.

Figure 39A:
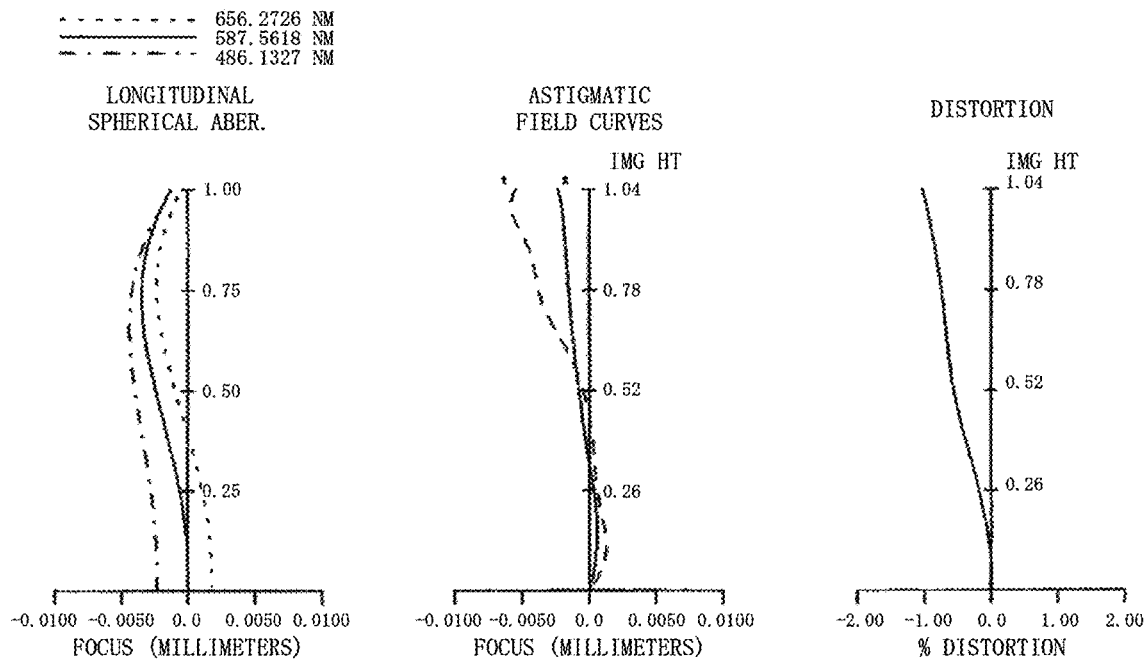
FIG. 39A is an aberration figure of the projection zoom lens according to Example 4.
Figure 39B:
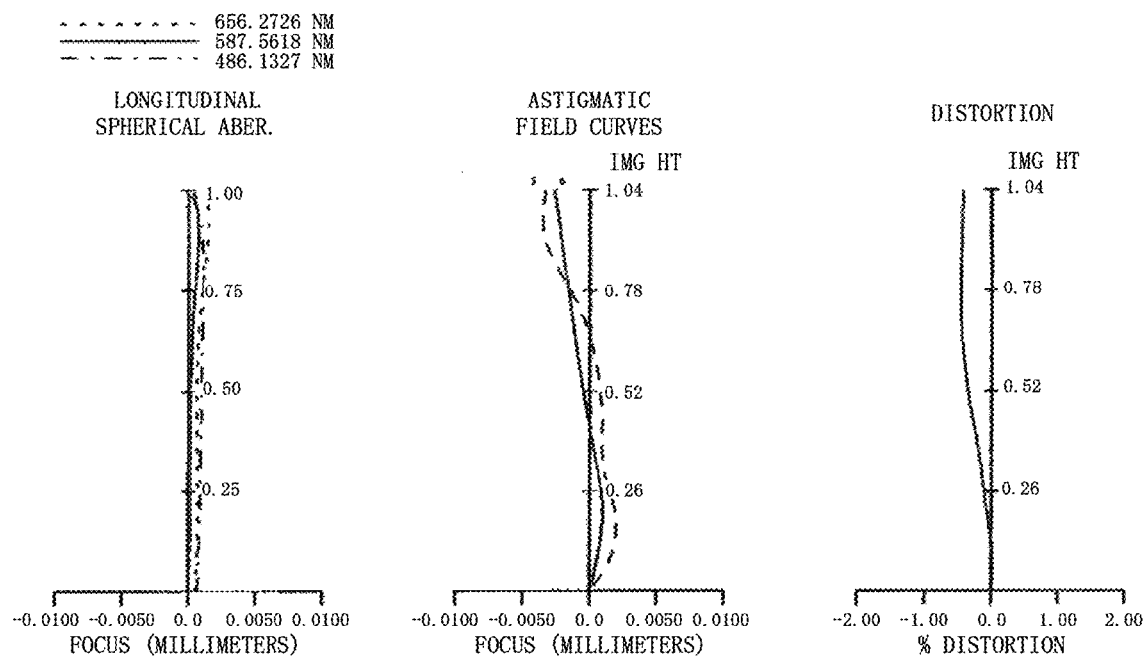
FIG. 39B is an aberration figure of the projection zoom lens according to Example 4.

FIG. 38 indicates the values of each parameter of the conditional formulae (1) to (10) for the projection zoom lens of Example 4. The projection zoom lens of Example 4 satisfies the conditional formulae (1) to (10). FIG. 39 depicts the aberration figure of the projection zoom lens of Example 4 in a similar manner as in FIG. 15.

As illustrated in each aberration figure, Example 4 exhibits excellent performance.

Example 5

Figure 5:
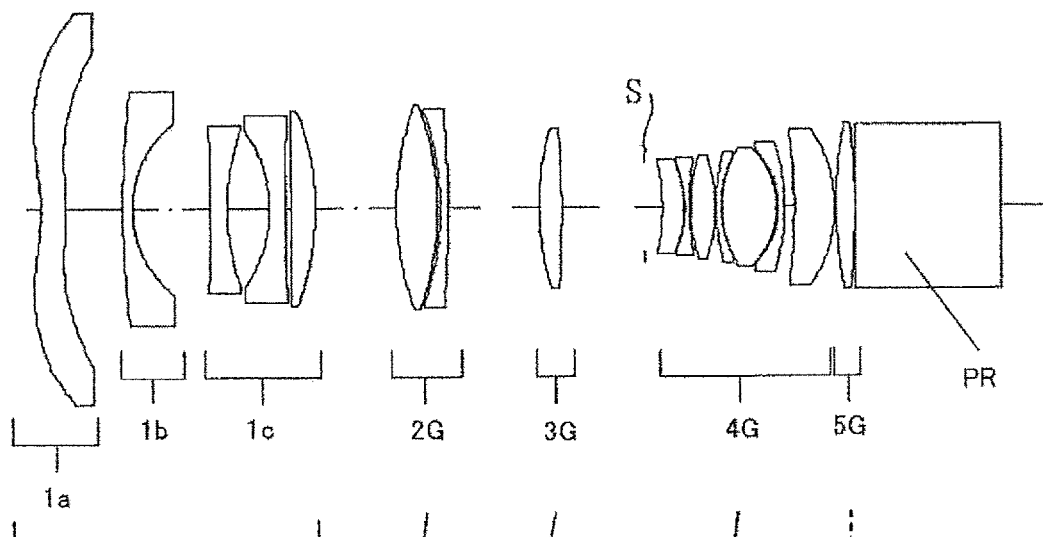
FIG. 5 is a figure illustrating the arrangement of a group of lenses at a wide-angle and a group of lenses at a telephoto end of the projection zoom lens according to the Example 5.
Figure 5:
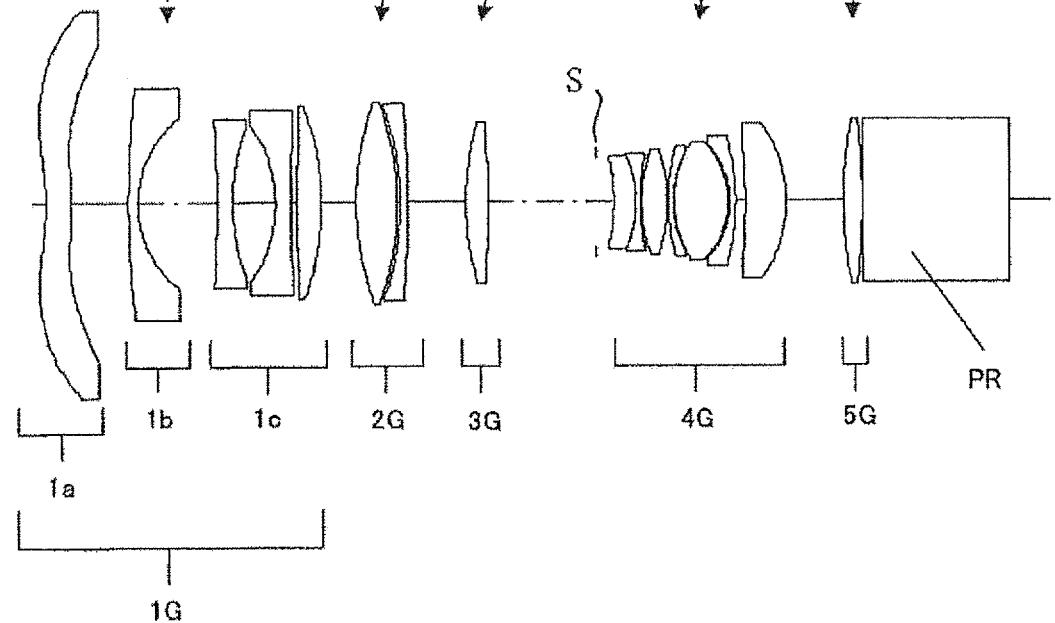

Example 5 is an example illustrated in FIG. 5, and the configuration is as described above. The data of Example 5 is indicated in FIG. 40 in a similar manner as illustrated in FIG. 8. In FIG. 40, the surface number "0" is a "projected plane" and the surface number "IMG" is an "image display plane". In the same manner as Examples 1 to 4, Example 5 includes virtual planes (surface numbers "1" and "14"). The plane spacing between the surface number including the virtual plane "0" and the surface number "IMG" is set as the plane spacing "d (d0 to dIMG)" as illustrated in the figures. The surface numbers "42 and 43" are "prismatic surfaces of color synthesis prism PR". Furthermore, the plane numbers "44 and 45" are cover glass planes provided on the image display of the image display device.

[Data of Aspheric Surface]

FIG. 41 indicates data of the aspheric surfaces of the projection zoom lens of Example 5.

In FIG. 42, "optical data" at the wide-angle end (Wide), the middle focal length (Middle), and the telephoto end (Tele) of the projection zoom lens in Example 5 are illustrated in a similar manner as in FIG. 10. In FIG. 43, the focal length of each group in Example 5 is illustrated in a similar manner as in FIG. 11.

FIG. 44A indicates the wide-angle end (Wide), the middle focal length (Middle), and the telephoto end (Tele) due to the change of plane spacing according to zooming. Zooming is achieved by moving the second group G2 to the fourth group G4, so that the plane spacings such as 15, 20, 23, and 39 change. The change in plane spacing "d0" between a target surface (surface number "0") and a virtual surface "1" is constant (148 mm). FIG. 44B indicates the short range, medium range, and long range due to the change of plane spacing according to focusing. Focusing is achieved by moving the spacing of planes in the first sub-lens group 1*a*, the second sub-lens group 1*b*, and the third sub-lens group 1*c* in the first group 1G. Therefore, the plane spacings such as d0, d1, d4, d7, and d14 change. FIG. 45A indicates "wide-angle end and telephoto end" of the spacing between adjacent groups of the first group 1G, the second group 2G, the third group 3G, the fourth group 4G, and the fifth group 5G according to zooming, in a similar manner as in FIG. 13.

FIG. 45B indicates the "short range and long range" of the changes in spacing, associated with focusing, of the first sub-lens group 1*a*, the second sub-lens group 1*b*, and the third sub-lens group 1*c*; and of the changes in plane spacing, associated with focusing, of the third sub-lens group 1*c* and the second group 2G.

Figure 47A:
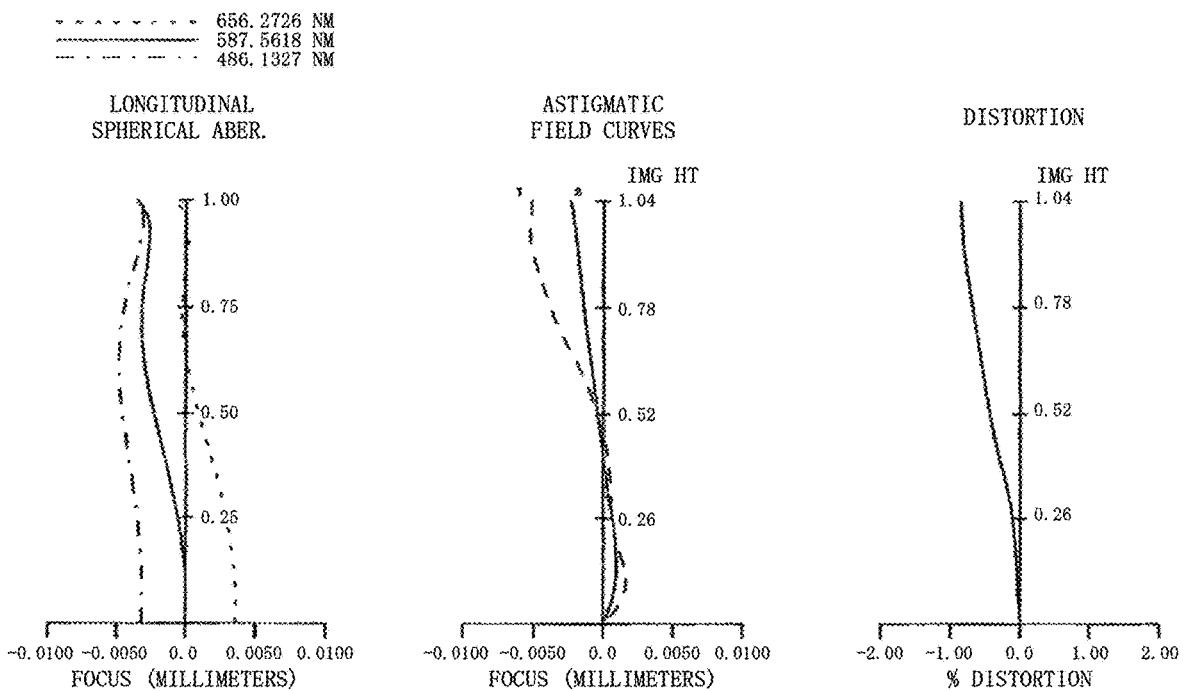
FIG. 47A is an aberration figure of the projection zoom lens according to Example 5.
Figure 47B:
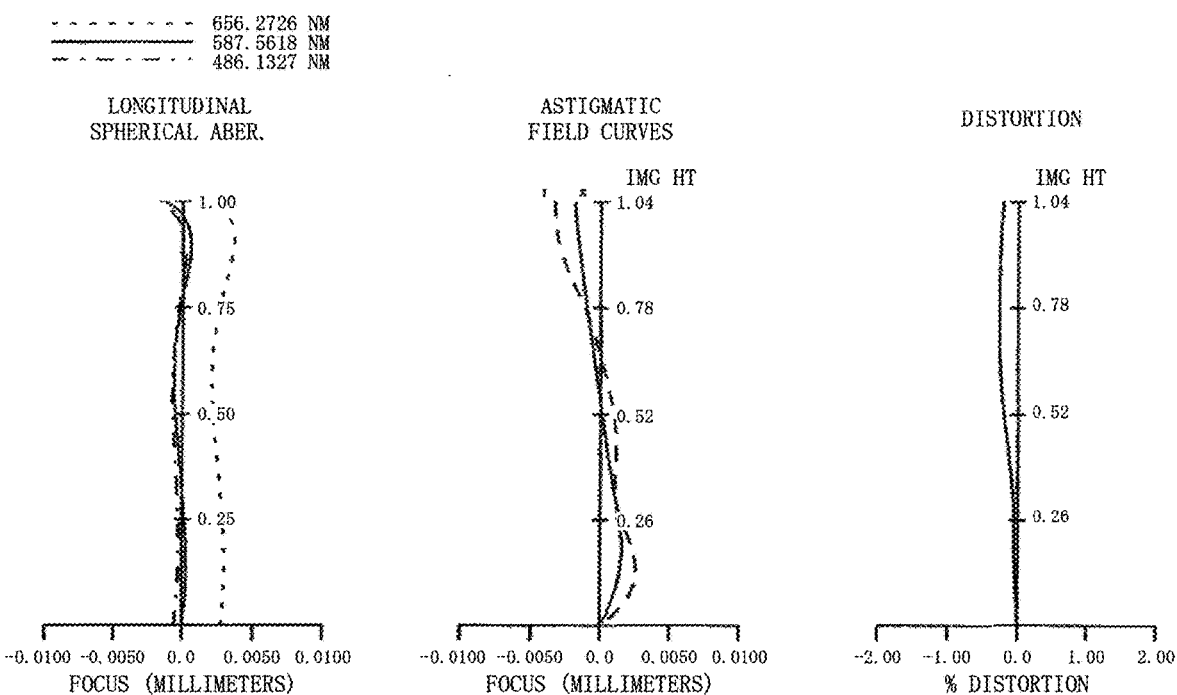
FIG. 47B is an aberration figure of the projection zoom lens according to Example 5.

FIG. 46 indicates the values of each parameter of the conditional formulae (1) to (10) for the projection zoom lens of Example 5. The projection zoom lens of Example 5 satisfies the conditional formulae (1) to (10). FIG. 47 indicates the aberration figure of the projection zoom lens of Example 5 in a similar manner as in FIG. 15.

As shown in each aberration figure, Example 5 exhibits excellent performance.

Example 6

Figure 6:
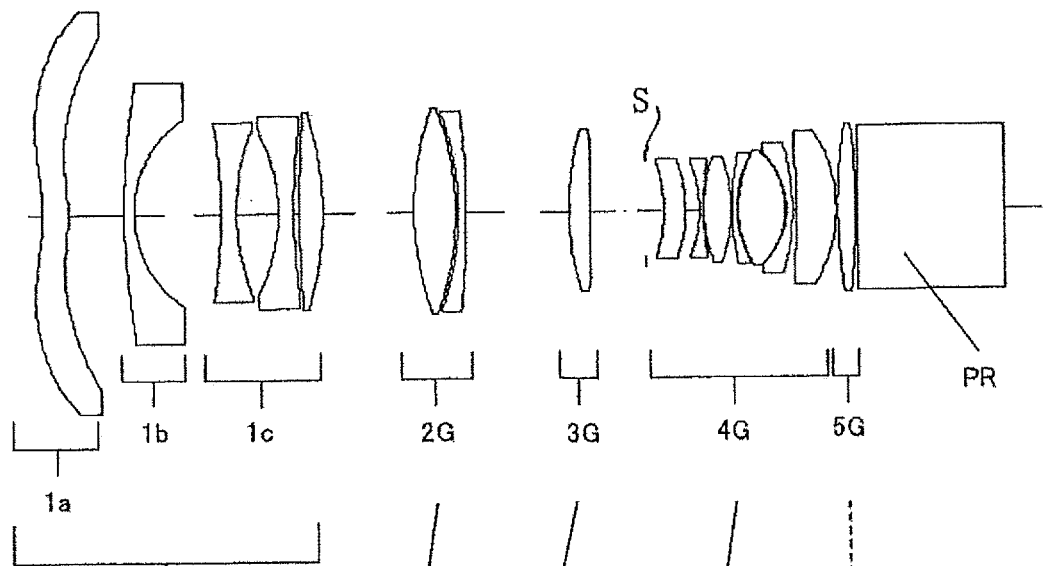
FIG. 6 is a figure illustrating the arrangement of a group of lenses at a wide-angle and a group of lenses at a telephoto end of the projection zoom lens according to the Example 6.
Figure 6:
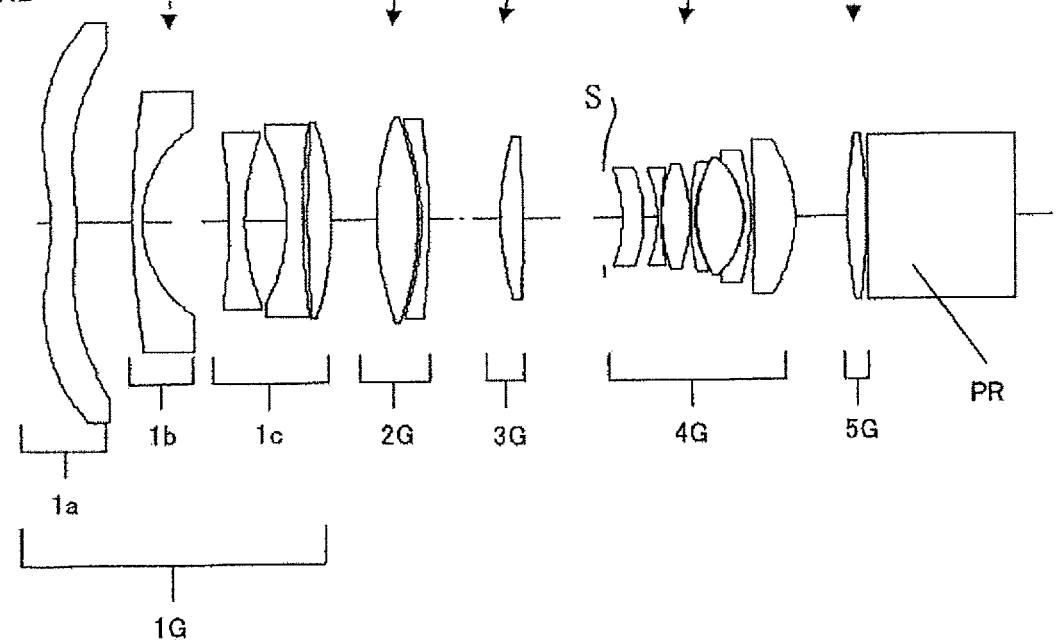

Example 6 is an example illustrated in FIG. 6, and the configuration is as described above. The data of Example 6 is indicated in FIG. 48 in a similar manner as illustrated in FIG. 8. In FIG. 48, the surface number "0" is a "projected plane" and the surface number "IMG" is an "image display plane". In the same manner as Examples 1 to 5, Example 6 includes virtual planes (surface numbers "1" and "14"). The plane spacing between the surface number including the virtual plane "0" and the surface number "IMG" is set as the plane spacing "d (d0 to dIMG)" as illustrated in the figures. The surface numbers "42 and 43" are "prismatic surfaces of color synthesis prism PR". Furthermore, the plane numbers "44 and 45" are cover glass planes provided on the image display of the image display device.

[Data of Aspheric Surface]

FIG. 49 indicates data of the aspheric surfaces of the projection zoom lens of Example 6.

In FIG. 50, "optical data" at the wide-angle end (Wide), the middle focal length (Middle), and the telephoto end (Tele) of the projection zoom lens in Example 6 are illustrated in a similar manner as in FIG. 10. In FIG. 51, the focal length of each group in Example 6 is illustrated in a similar manner as in FIG. 11.

FIG. 52A indicates the wide-angle end (Wide), the middle focal length (Middle), and the telephoto end (Tele) due to the change of plane spacing according to zooming. Zooming is achieved by moving the second group G2 to the fourth group G4, so that the plane spacings such as 15, 20, 23, and 39 change. The change in plane spacing "d0" between a target surface (surface number "0") and a virtual surface "1" is constant (148 mm). FIG. 52B indicates the short range, medium range, and long range due to the change of plane spacing according to focusing. Focusing is achieved by moving the spacing of planes in the first sub-lens group 1*a*, the second sub-lens group 1*b*, and the third sub-lens group 1*c* in the first group 1G. Therefore, the plane spacings such as d0, d1, d4, d7, and d14 change. FIG. 53A indicates "wide-angle end and telephoto end" of the spacing between adjacent groups of the first group 1G, the second group 2G, the third group 3G, the fourth group 4G, and the fifth group 5G according to zooming, in a similar manner as in FIG. 13.

FIG. 53B indicates the "short range and long range" of the changes in spacing, associated with focusing, of the first sub-lens group 1*a*, the second sub-lens group 1*b*, and the third sub-lens group 1*c*; and of the changes in plane spacing, associated with focusing, of the third sub-lens group 1*c* and the second group 2G.

Figure 55A:
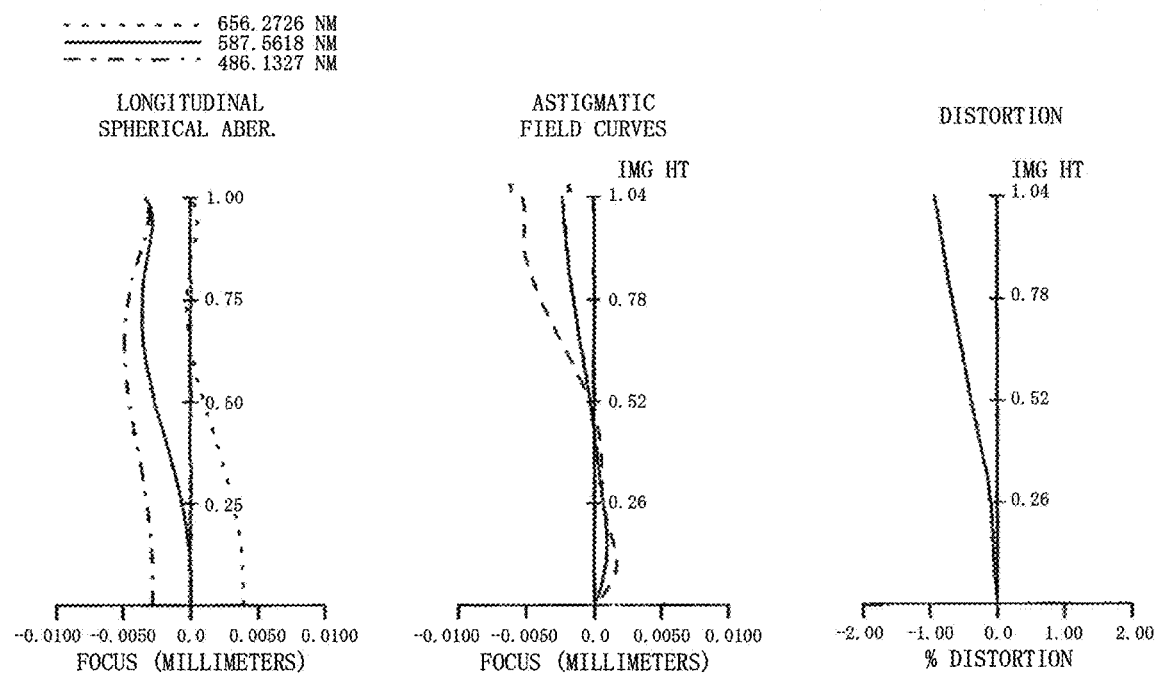
FIG. 55A is an aberration figure of the projection zoom lens according to Example 6.
Figure 55B:
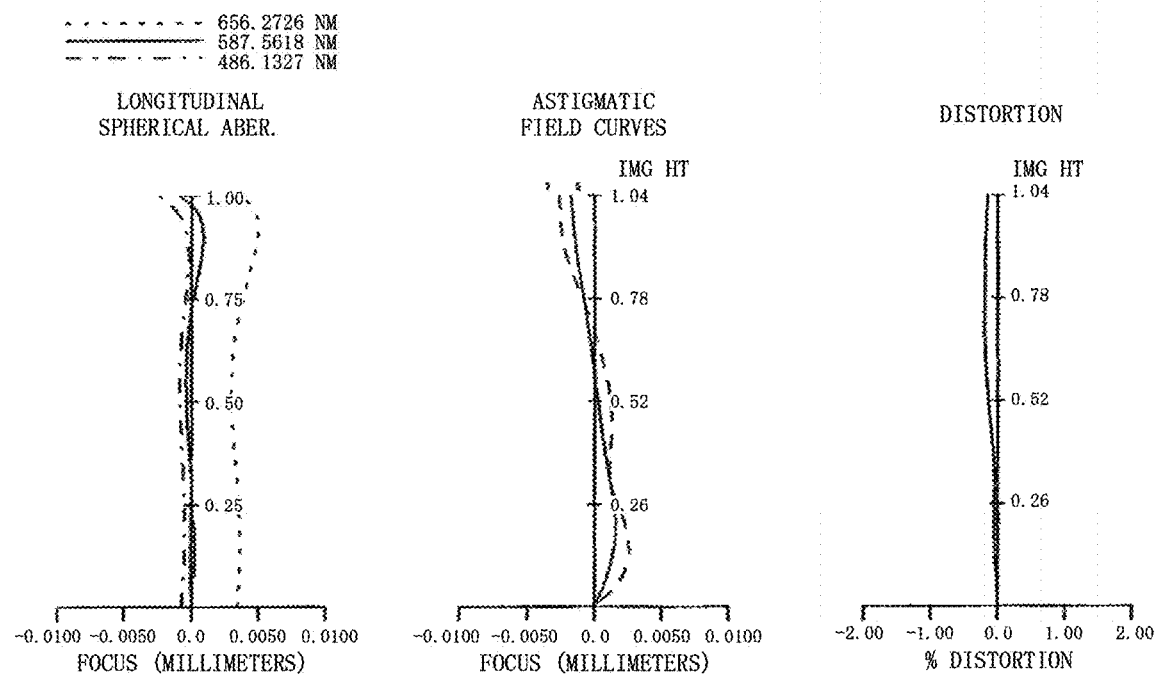
FIG. 55B is an aberration figure of the projection zoom lens according to Example 6.

FIG. 54 indicates the values of each parameter of the conditional formulae (1) to (10) for the projection zoom lens of Example 6. The projection zoom lens of Example 6 satisfies the conditional formulae (1) to (10). FIG. 55 indicates the aberration figure of the projection zoom lens of Example 6 in a similar manner as in FIG. 15.

As shown in each aberration figure, Example 6 exhibits excellent performance.

Example 7

Example 7 is an example illustrated in FIG. 7, and the configuration is as described above. The data of Example 7 is indicated in FIG. 56 in a similar manner as illustrated in FIG. 8. In FIG. 56, the surface number "0" is a "projected plane" and the surface number "IMG" is an "image display plane". In the same manner as Examples 1 to 6, Example 7 includes virtual planes (surface numbers "1" and "14"). The plane spacing between the surface number including the virtual plane "0" and the surface number "IMG" is set as the plane spacing "d (d0 to dIMG)" as illustrated in the figures. The surface numbers "42 and 43" are "prismatic surfaces of color synthesis prism PR".

[Data of Aspheric Surface]

FIG. 57 indicates data of the aspheric surfaces of the projection zoom lens of Example 7.

In FIG. 58, "optical data" at the wide-angle end (Wide), the middle focal length (Middle), and the telephoto end (Tele) of the projection zoom lens in Example 7 are illustrated in a similar manner as in FIG. 10. In FIG. 59, the focal length of each group in Example 7 is illustrated in a similar manner as in FIG. 11.

FIG. 60A indicates the wide-angle end (Wide), the middle focal length (Middle), and the telephoto end (Tele) due to the change of plane spacing according to zooming. Zooming is achieved by moving the second group G2 to the fourth group G4, so that the plane spacings such as 15, 20, 23, and 39 change. The change in plane spacing "d0" between a target surface (surface number "0") and a virtual surface "1" is constant (148 mm). FIG. 60B indicates the short range, medium range, and long range due to the change of plane spacing according to focusing. Focusing is achieved by moving the spacing of planes in the first sub-lens group 1$a$, the second sub-lens group 1$b$, and the third sub-lens group 1$c$ in the first group 1G. Therefore, the plane spacings such as d0, d1, d4, d7, and d14 change. FIG. 61A indicates "wide-angle end and telephoto end" of the spacing between adjacent groups of the first group 1G, the second group 2G, the third group 3G, the fourth group 4G, and the fifth group 5G according to zooming, in a similar manner as in FIG. 13.

FIG. 61B indicates the "short range and long range" of the changes in spacing, associated with focusing, of the first sub-lens group 1$a$, the second sub-lens group 1$b$, and the third sub-lens group 1$c$; and of the changes in plane spacing, associated with focusing, of the third sub-lens group 1$c$ and the second group 2G.

Figure 63A:
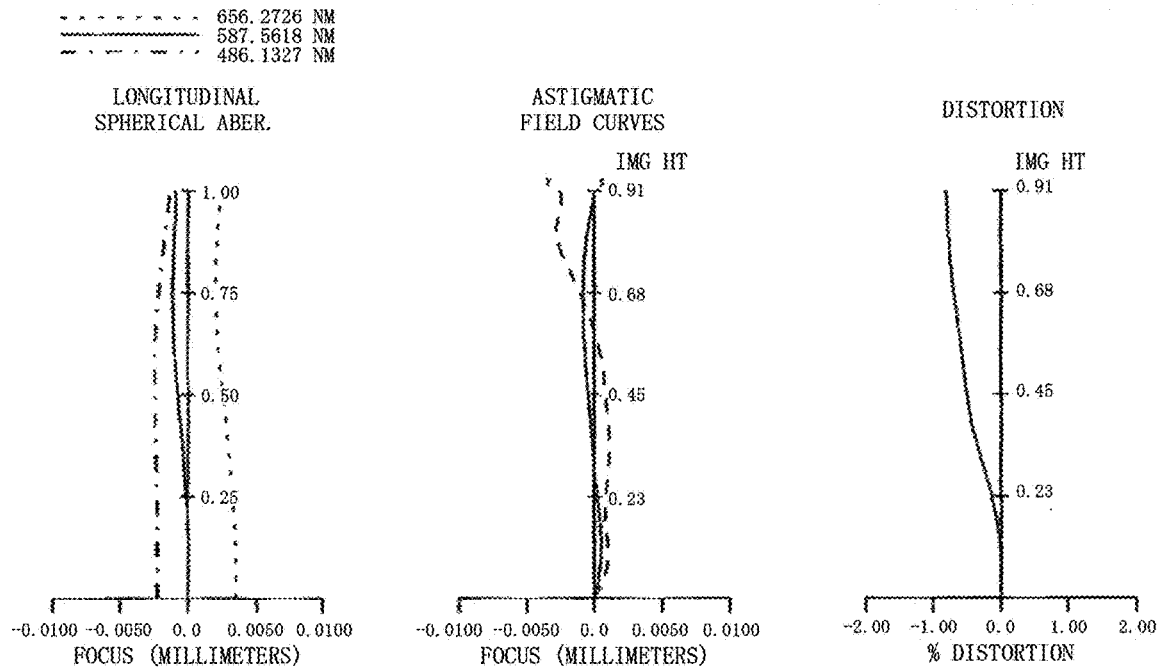
FIG. 63A is an aberration figure of the projection zoom lens according to Example 7.
Figure 63B:
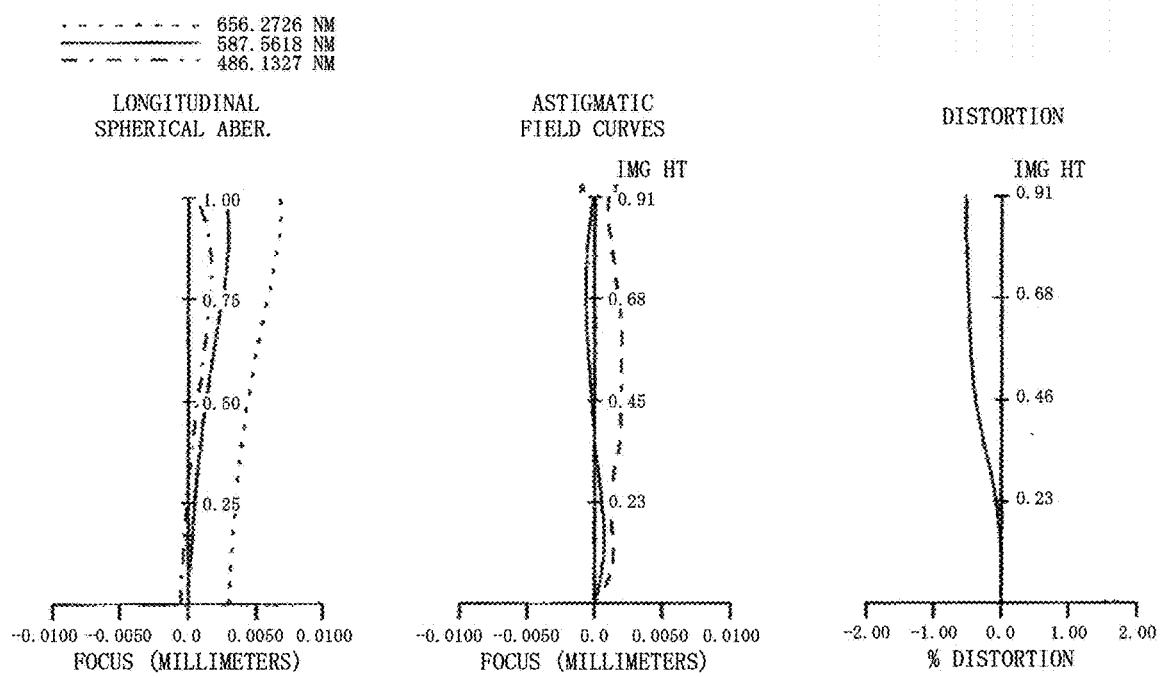
FIG. 63B is an aberration figure of the projection zoom lens according to Example 7.

FIG. 62 indicates the values of each parameter of the conditional formulae (1) to (10) for the projection zoom lens of Example 7. The projection zoom lens of Example 7 satisfies the conditional formulae (1) to (10). FIG. 63 indicates the aberration figure of the projection zoom lens of Example 7 in a similar manner as in FIG. 15.

As illustrated in each aberration figure, Example 6 exhibits excellent performance.

Hereinafter, one embodiment of a projector using the projection zoom lens of the present invention will be described with reference to FIG. 64.

Figure 64:
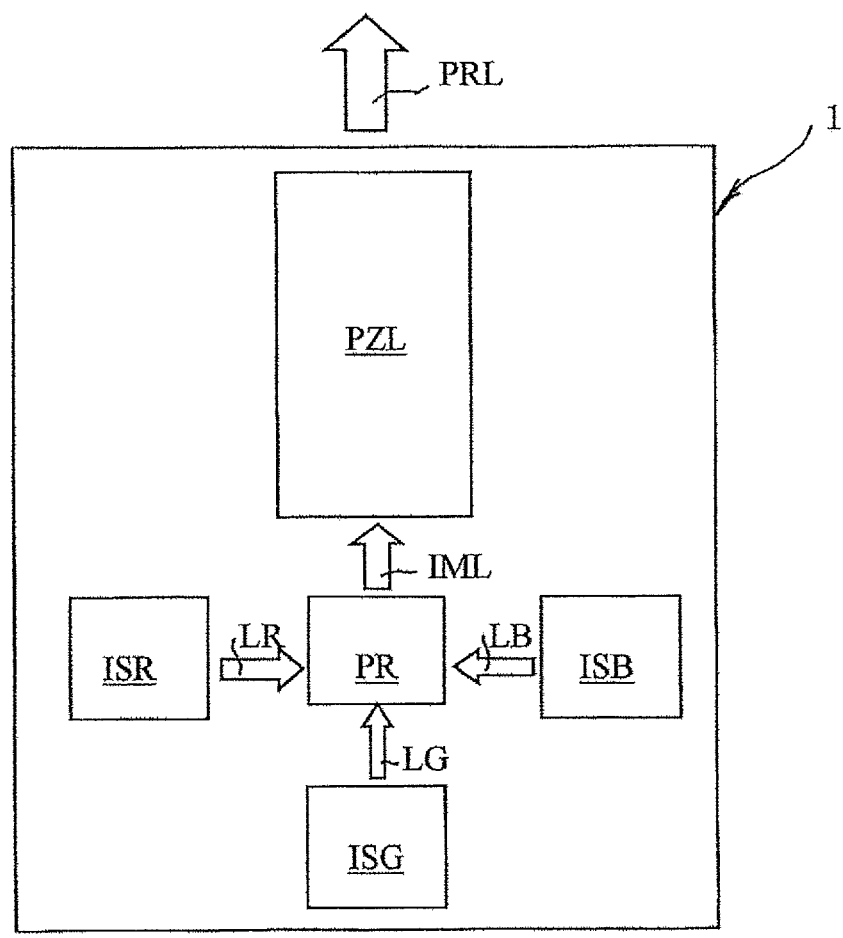
FIG. 64 is a figure to explain an embodiment of an example of a projection device.

FIG. 64 schematically illustrates one embodiment of a projector. Inside a casing 1 of the projector body, a projection zoom lens PZL, image generator device ISR, ISB, and ISG using the "image display devices" such as a liquid crystal panel, and a color synthesis prism PR are loaded.

The image generator device ISR displays a "red component image" of the color image to be projected on the image display surface of the image display device, generates "red component image light LR", and emits it toward the color synthesis prism PR.

The image generator device ISG displays a "green component image" of the color image on the image display surface of the image display device, generates "green component image light LG", and emits it toward the color synthesis prism PR.

The image generator ISB displays a "blue component image" of a color image on the image display surface of the image display device, generates "blue component image light LB", and emits it toward the color synthesis prism PR.

The color synthesis prism PR synthesizes red component image light LR, green component image light LG, and blue component image light LB to be "color image light IML" to be transmitted into the projection zoom lens PZL.

The projection zoom lens PZL emits incoming color image light IML toward a screen as the projection image forming light PRL.

As the projection zoom lens PZL, the zoom lenses described above, such as Examples 1 to 7, can be used. Although preferred embodiments of the invention have been described above, the invention is not limited to the specific embodiments described above, and various modifications and alterations can be made within the scope of the claimed invention, unless otherwise specified in the above-described description. The effects described in the embodiments of the present invention are merely listed in the list of preferred effects arising from the invention, and the effects of the invention are not limited to those described in the embodiments.

What is claimed is:

1. A projection zoom lens is configured by a first group having a negative refractive force, a second group having a positive refractive force, a third group having a positive refractive force, an aperture diaphragm, a fourth group having a positive refractive force, and a fifth group having a positive refractive force,
   wherein the groups are arranged in aforementioned order from an enlarged-side to a reduced-side in the projection zoom lens,
   wherein the projection zoom lens is telecentric on the reduced-side,
   wherein the first group is configured by
   a first sub-lens group having a positive or a negative refractive force,
   a second sub-lens group having a negative refractive force, and
   a third sub-lens group having a negative refractive force,
   wherein the sub-lens groups are arranged sequentially from the enlarged-side to form a focusing group,
   wherein the second group to the fifth group constitute a zooming group,
   wherein the focusing group changes a spacing between the first sub-lens group and the second sub-lens group and a spacing between the second sub-lens group and the third sub-lens group, while the projection zoom lens is changing focus from an infinite distance to a near distance, and
   wherein each of the second group to the fourth group is moved independently to the enlarged-side while the projection zoom lens is magnifying from a wide-angle end to a telephoto end, thereby performing zooming,
   wherein a focal length of the focusing group is fg1, a focal length of the second group of the zooming group is fg2, and a focal length of an entirety of the projection zoom lens at the wide-angle end is fw, the following conditional formulae are satisfied:

$-2.5 < fg1/fw < -1.5$ (8)

$5 < fg2/fw < 12$ (9).

2. The projection zoom lens according to claim 1,
   wherein the fifth group is fixed while the zooming is performed.

3. The projection zoom lens according to claim 1,
   wherein the first sub-lens group has a negative refractive force, and
   wherein a focal length of the first sub-lens group is f1$a$, a focal length of the third sub-lens group is f1$c$, and the following conditional formulae are satisfied:

$-30 < f1a/fw < -5$ (1)

$-30 < f1c/fw < -4$ (2).

4. The projection zoom lens according to claim 1,
wherein the fifth group includes one or more lenses having a positive refractive force, and a lens at a most reduced-side has a positive refractive force,
wherein the lens at the most reduced-side has a focal length of f5, an Abbe number of a lens material of vd5, and the following the following conditional formulae are satisfied:

$$0.1<fw/f5<0.3 \quad (3)$$

$$vd5<26 \quad (4).$$

5. The projection zoom lens according to claim 1,
wherein the second group includes one or more lenses having a negative refractive force in addition to a lens having positive refractive force,
wherein among the lens having negative refractive force and the lens having positive refractive force, an Abbe number of a lens material having a positive refractive force at a most reduced end is vd2p and an Abbe number of a lens material having a negative refractive force at the most reduced end is vd2n, the following conditional formulae are satisfied:

$$5<vd2p-vd2n<15 \quad (5)$$

$$vd2n<25 \quad (6).$$

6. The projection zoom lens according to claim 1,
wherein both sides of a lens among the focusing group at a most enlarged side are aspherical, and
wherein a radius of curvature of the enlarged-side is L11R1, a radius of curvature of a paraxial axis of the reduced-side is L11R2, and the following conditional formula is satisfied:

$$-0.5<(L11R1-L11R2)/(L11R1+L11R2)<-0.1 \quad (7).$$

7. The projection zoom lens according to claim 1,
wherein the first group has a lens that both sides of a lens at the enlarged-side are aspheric, concave at the enlarged-side in a paraxial region and convex at the enlarged-side in a peripheral region.

8. The projection zoom lens according to claim 1,
wherein the third sub-lens group includes a plurality of lenses including a negative lens, and
wherein an Abbe number of a lens material having a negative refractive force at a most reduced-side in the third sub-lens group is vd1c and the following formula is satisfied:

$$70<vd1c\leq81.61 \quad (10).$$

9. The projection zoom lens according to claim 1, wherein the fifth group is configured by one lens having a positive refractive.

10. A projection device using the projection zoom lens of claim 1.

11. A projection zoom lens is configured by a first group having a negative refractive force, a second group having a positive refractive force, a third group having a positive refractive force, an aperture diaphragm, a fourth group having a positive refractive force, and a fifth group having a positive refractive force,
wherein the groups are arranged in aforementioned order from an enlarged-side to a reduced-side in the projection zoom lens,
wherein the projection zoom lens is telecentric on the reduced-side,
wherein the first group is configured by
a first sub-lens group having a positive or a negative refractive force,
a second sub-lens group having a negative refractive force, and
a third sub-lens group having a negative refractive force,
wherein the sub-lens groups are arranged sequentially from the enlarged-side to form a focusing group,
wherein the second group to the fifth group constitute a zooming group,
wherein the focusing group changes a spacing between the first sub-lens group and the second sub-lens group and a spacing between the second sub-lens group and the third sub-lens group, while the projection zoom lens is changing focus from an infinite distance to a near distance, and
wherein each of the second group to the fourth group is moved independently to the enlarged-side while the projection zoom lens is magnifying from a wide-angle end to a telephoto end, thereby performing zooming,
wherein the first sub-lens group and the second sub-lens group in the first group are both configured by a single lens having a negative refractive force, and
wherein the third sub-lens group in the first group is configured by three lenses arranged with a lens having a negative refractive force, a lens having a negative refractive force, and a lens having a positive refractive force from the enlarged-side.

12. A projection zoom lens is configured by a first group having a negative refractive force, a second group having a positive refractive force, a third group having a positive refractive force, an aperture diaphragm, a fourth group having a positive refractive force, and a fifth group having a positive refractive force,
wherein the groups are arranged in aforementioned order from an enlarged-side to a reduced-side in the projection zoom lens,
wherein the projection zoom lens is telecentric on the reduced-side,
wherein the first group is configured by
a first sub-lens group having a positive or a negative refractive force,
a second sub-lens group having a negative refractive force, and
a third sub-lens group having a negative refractive force,
wherein the sub-lens groups are arranged sequentially from the enlarged-side to form a focusing group,
wherein the second group to the fifth group constitute a zooming group,
wherein the focusing group changes a spacing between the first sub-lens group and the second sub-lens group and a spacing between the second sub-lens group and the third sub-lens group, while the projection zoom lens is changing focus from an infinite distance to a near distance, and
wherein each of the second group to the fourth group is moved independently to the enlarged-side while the projection zoom lens is magnifying from a wide-angle end to a telephoto end, thereby performing zooming,
wherein the first sub-lens group in the first group is configured by one lens having a negative refractive force,
wherein the second sub-lens group in the first group is configured by two lenses having a negative refractive force, and wherein the third sub-lens group in the first group is configured by arranging a lens having a negative refractive force and a lens having a positive refractive force from the enlarged-side.

\* \* \* \* \*